United States Patent
Shitomi et al.

(10) Patent No.: US 7,484,066 B2
(45) Date of Patent: Jan. 27, 2009

(54) ASSURING PERFORMANCE OF EXTERNAL STORAGE SYSTEMS

(75) Inventors: Hidehisa Shitomi, Mountain View, CA (US); Yoshiki Kano, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 286 days.

(21) Appl. No.: 11/107,598

(22) Filed: Apr. 15, 2005

(65) Prior Publication Data

US 2006/0236060 A1    Oct. 19, 2006

(51) Int. Cl.
*G06F 12/00* (2006.01)

(52) U.S. Cl. ...................... 711/170

(58) Field of Classification Search .......... 711/113, 711/114, 170
See application file for complete search history.

(56) References Cited

U.S. PATENT DOCUMENTS 4,679,153 A * 7/1987 Robinson et al. ............ 345/468
6,529,976 B1   3/2003 Fukuzawa et al.
2003/0188114 A1 * 10/2003 Lubbers et al. ............. 711/162

OTHER PUBLICATIONS

Hitachi Freedom Storage Lightning 9900 V Series Priority Access (Prioritized Port Control) User's Guide, Hitachi Data Systems, 2002.*
Hitachi Freedom Storage Lightning 9900V Series, Performance Monitor (Performance Management) User's Guide, p. 3-13, Hitachi Data Systems, 2002.*
"SCSI Reservation command: T10 draft: SCSI-2 Small Computer System Interface," working draft from INCITS Technical Committee T10 available at www.t10.org, pp. 189-192 (Apr. 1996).
Harris et al. "LPAR Configuration and Management Working with IBM @server iSeries Logical Partitions," IBM Redbook, p. 1-13 (Apr. 2002).

* cited by examiner

*Primary Examiner*—Matt Kim
*Assistant Examiner*—John P Fishburn
(74) *Attorney, Agent, or Firm*—Mattingly, Stanger, Malur & Brundidge, PC

(57) ABSTRACT

In a system having an internal storage system and an external storage system, a technique is provided for allowing the external storage system to inherit performance parameters from the internal storage system. Management tables are established in each of the two storage systems, and data pertaining to desired operational characteristics stored in the management table in the internal storage system. That information is transferred to the external storage system and used control its operations in accordance with the desired performance parameter.

18 Claims, 27 Drawing Sheets

| WWN | LUN | Priority | Upper Limit |
|---|---|---|---|
| 1 | 1 | No | 10MB/s |
| 2 | 2 | Yes | |

| WWN | LUN | Ext | Priority | Upper Limit |
|---|---|---|---|---|
| 1 | 1 | N | No | 10MB/s |
| 2 | 2 | Y (str2, LUN3) | Yes | - |

Figure 7

ASSURING PERFORMANCE OF EXTERNAL STORAGE SYSTEMS

BACKGROUND OF THE INVENTION

This invention relates to storage systems, and in particular to techniques of assuring appropriate performance of external storage systems coupled to local storage systems, for example, in situations where storage controller based virtualization is employed.

Large organizations throughout the world now are involved in millions of transactions which include enormous amounts of text, video, graphical and audio information. This information is being categorized, stored, accessed, and transferred every day. The volume of such information continues to grow. One technique for managing such massive amounts of information is to use storage systems. Commercially available storage systems include large numbers of hard disk drives operating under various control mechanisms to record, mirror, remotely backup, and reproduce this data. The rapidly growing amount of data requires most companies to manage the data carefully with their information technology systems, and to assure appropriate performance within such systems.

One common occurrence in the management of such data is the need to assure its preservation by making remote copies of the information in a location away from a primary or production site. Maintaining such records in a remote site helps assure the owner of the data that the data will be available even if there are natural disasters or other unexpected events which occur at the primary site and destroy the data there. By having stored the data in a remote location, protection is also provided in the event of failures in the primary storage system, as well as other events. Should an event occur at the primary site, the data from the remote copy operation can be retrieved and replicated for use by the organization, thereby preventing data loss or the need to recreate the data at considerable cost and delay.

With an appropriate schedule (either synchronously or asynchronously) with host operations changing data at the primary site, the data at the remote site (the "remote copy") is also updated via a communications network. The network can be dedicated to the transmission of data between the primary site and the remote site, use the Internet, or by other means. Of course, because the remote site is, by definition, located at a distance from the primary site to provide enhanced data protection, there is a delay between the time the data is stored at the primary site and the time the data is transmitted to and stored at the remote site. Depending upon the bandwidth of the connection and the particular equipment at the remote site, this delay can be significant. Examples of storage-based remote copy technology as provided by leading vendors are Hitachi TrueCopy™, EMC SRDF™, and IBM PPRC™.

In many such systems the remote site will have what is referred to as an external storage system, that is, a storage system which is not connected to the host at the primary site, but instead is connected to a host at the secondary site. This can allow priority conflicts to occur which prevent the data at the secondary site from being as current as the host at the primary site would like.

Virtualization of storage systems is becoming more widespread. Controller based virtualization is one of the typical ways to provide this functionality. In controller based virtualization, the storage controller presents the external storage system as a virtual system to the host. A typical mechanism for achieving this is described in U.S. Pat. No. 6,529,976 entitled "Heterogeneous Computer System, Heterogeneous Input Output System and Data Back-Up Method For The Systems," which is commonly assigned with this application.

Various techniques have been provided for attempting to assure the performance of storage systems. Prioritized port control (PPC) is one example. In PPC a mechanism is provided to define priorities, such as throughput, for some accesses. Because the prioritized accesses do not have any limitation to the logical unit or port, non-prioritized accesses have reduced throughput, helping assure that the prioritized accesses meet the desired standard. A detailed mechanism for achieving this is described in "Prioritized Port Control: Hitachi Freedom Storage Lightning 9900V Series, Priority Access User's Guide, page 3-13.

Another example of a known performance assuring mechanism is cache logical partitioning (CLPAR). In general, the cache memory in a storage system is shared by all write operations. By using CLPAR, however, some amount of the cache on the storage system can be reserved, or partitioned, for specific access to a logical unit.

Another example of a mechanism for helping assure desired performance is the SCSI "RESERVATION" command. Once "reservation" is set for a particular logical unit by an application, the SCSI commands from other applications are restricted. A more detailed explanation of that mechanism can be found at "SCSI RESERVATION command: T10 draft: SCSI-2 Small Computer System Interface, pages 189-192." Unfortunately, none of the above described techniques is operable in the context of an external storage system.

What is needed, however, is a technique by which external storage systems can be managed in a manner to enable their performance to be reliably controlled, and a specified measure of performance achieved.

BRIEF SUMMARY OF THE INVENTION

This invention provides a technique for assuring the performance, not only of storage systems directly connected to a particular host, but also of assuring the performance of external storage systems which are not directly connected to the host. These external storage systems are sometimes coupled to their own host, but are able to be involved in the storage of data provided from a primary location by techniques referred to as storage virtualization.

Preferably performance is controlled by providing mechanisms by which the performance parameter set in the primary storage system directly connected to the host, can also be forwarded to the external storage system. In such architectures typically two storage systems are provided, with a first system connected to the host and a second system providing the external storage. In some implementations a third system is added, with the second system connected to both the first and the third storage systems. Typically each of the first and second storage systems will have techniques for managing storage devices within the second and third storage subsystems as being part of the virtual storage device. The invention also provides a means for assuring quality of service for the host coupled to the first storage system.

In a preferred embodiment in a system having an internal storage system and an external storage system, a method is provided for allowing the external storage system to inherit parameters from the internal storage system. The method establishes in the internal storage system a first management table which includes, for at least one virtual logical storage unit, a performance parameter associated with storage system operations and a designation for the at least one virtual logical storage unit that a storage volume containing the virtual logical storage unit is physically present in the external storage system. In the external storage system, a second management table for the storage volume containing the virtual logical storage unit which is physically present in the external storage system is also established. Data is then transferred from the first management table to the second management table, and the external storage system is operated in accordance with the performance parameter transferred from the internal storage system.

BRIEF DESCRIPTION OF THE DRAWINGS

FIG. 7 illustrates a priority management table.

DETAILED DESCRIPTION OF THE INVENTION

Figure 1:
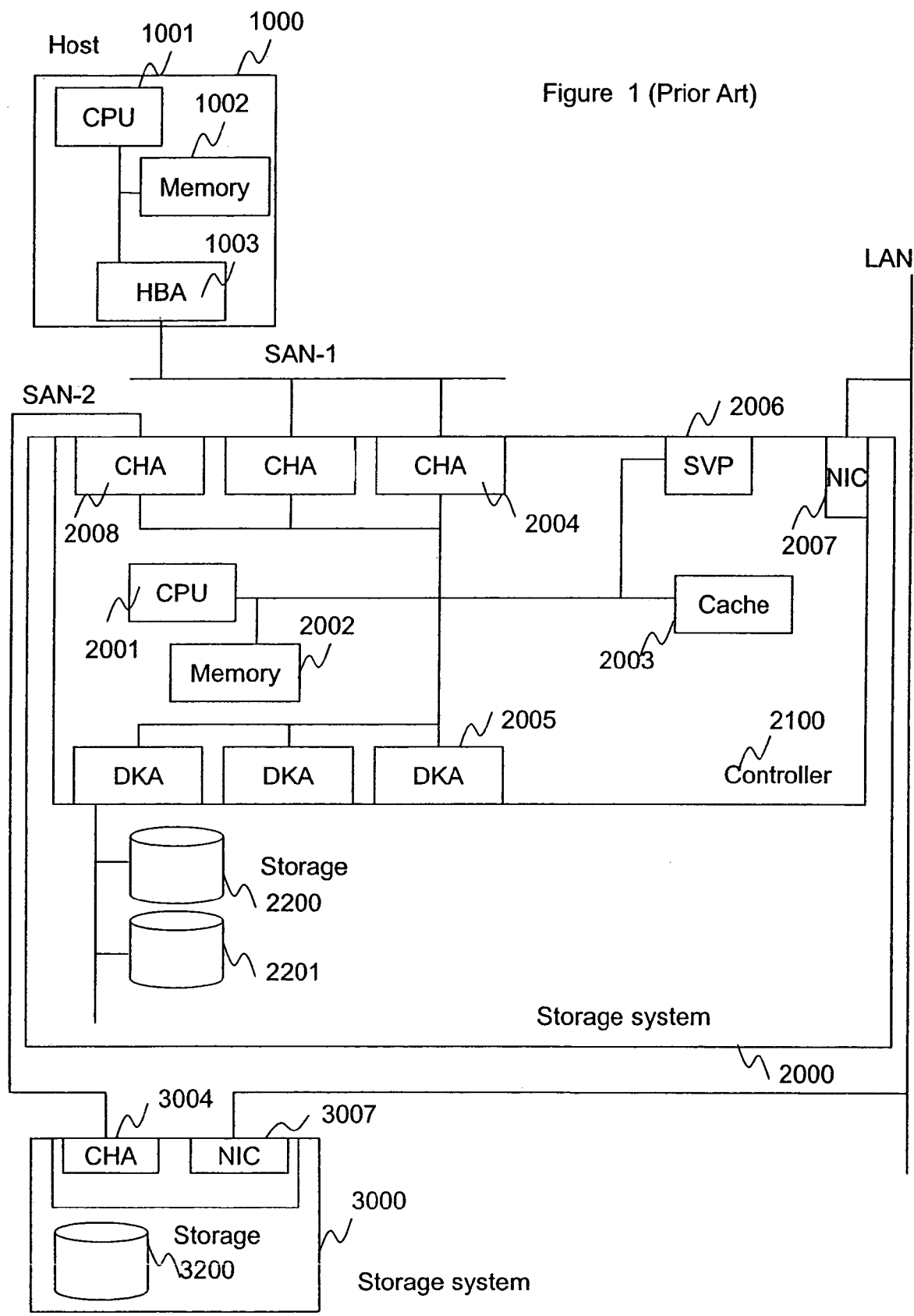
FIG. 1 is a diagram of the typical architecture for a storage system.

FIG. 1 is an example of the architecture for a storage system in which the method and apparatus of this invention can be applied. Generally the storage system includes a host 1000, a storage system 2000 and a remote storage system 3000. Host 1000 includes an application system, for example, a database program, which is running on CPU 1001. Host 1000 is connected to a storage system 2000 via a host bus adaptor 1003. If desired, additional HBA connections to storage system 2000 may also be provided. In operation, the application system will issue input/output (I/O) operations to storage system 2000, which in response stores and retrieves data, providing it to the host. Storage system 2000 typically includes a variety of components as represented by a storage controller 2100 and storage media 2200, 2201. The media preferably comprises hard disk drives, however, other storage media can also be employed.

Within storage controller 2100, a CPU 2001, memory 2002 and a cache memory 2003 are provided. The service processor 2006 manages the operation of the storage system. The storage controller also includes host interfaces such as channel adapters 2004 and external storage interfaces 2008. A network interface card 2007 couples the storage controller to a local area network, or other communications interface.

In operation the CPU 2001 processes I/O requests or performs other operations involving data stored in memory 2002. Typically CPU 2001 executes a stored program. In general, cache memory 2003 stores write data from the host computer 1000 on a temporary basis before the data is stored into the storage devices 2200. In addition, the cache 2003 can store the read data that are requested by the host 1000. Cache memory 2003 is usually a non-volatile memory, which may be backed up with a battery. In some implementations, however, memory 2002 and cache memory 2003 can be combined into a single memory.

A host interface 2004 connects between the host 1000 and the storage system 2000, for example, using a Fibre Channel or Ethernet protocol. The hard disk drives, or other storage media, are connected to the controller through disk interfaces 2005. An external storage interface 2008 connects between the storage system 2000 and an external storage system 3000, typically situated at a location remote from storage system 2000 to provide disaster recovery capability. The remote system 3000 also may be coupled to the local system 2000 using Fibre Channel, Ethernet, or other desired communication means. Service processor 2006 enables setting and changing the configuration of the storage system 2000. The storage 2200 itself, in high performance systems, will typically comprise an array of SCSI hard disk drives.

An external or remote storage system 3000 typically is connected to the local or primary storage system 2000 using a channel interface 3004. Often the configuration of the external storage system 3000 will be similar to that of storage system 2000, although the performance of such a system, for example its I/O speed, memory size, and all other parameters can be different from the specific parameters used in system 2000. In addition, system 3000 will often be coupled to its own host in the remote location for processing storage requests from that host. The configuration of hosts and storage systems depicted in FIG. 1 is now well known, and many different variations are commercially available.

Figure 2:
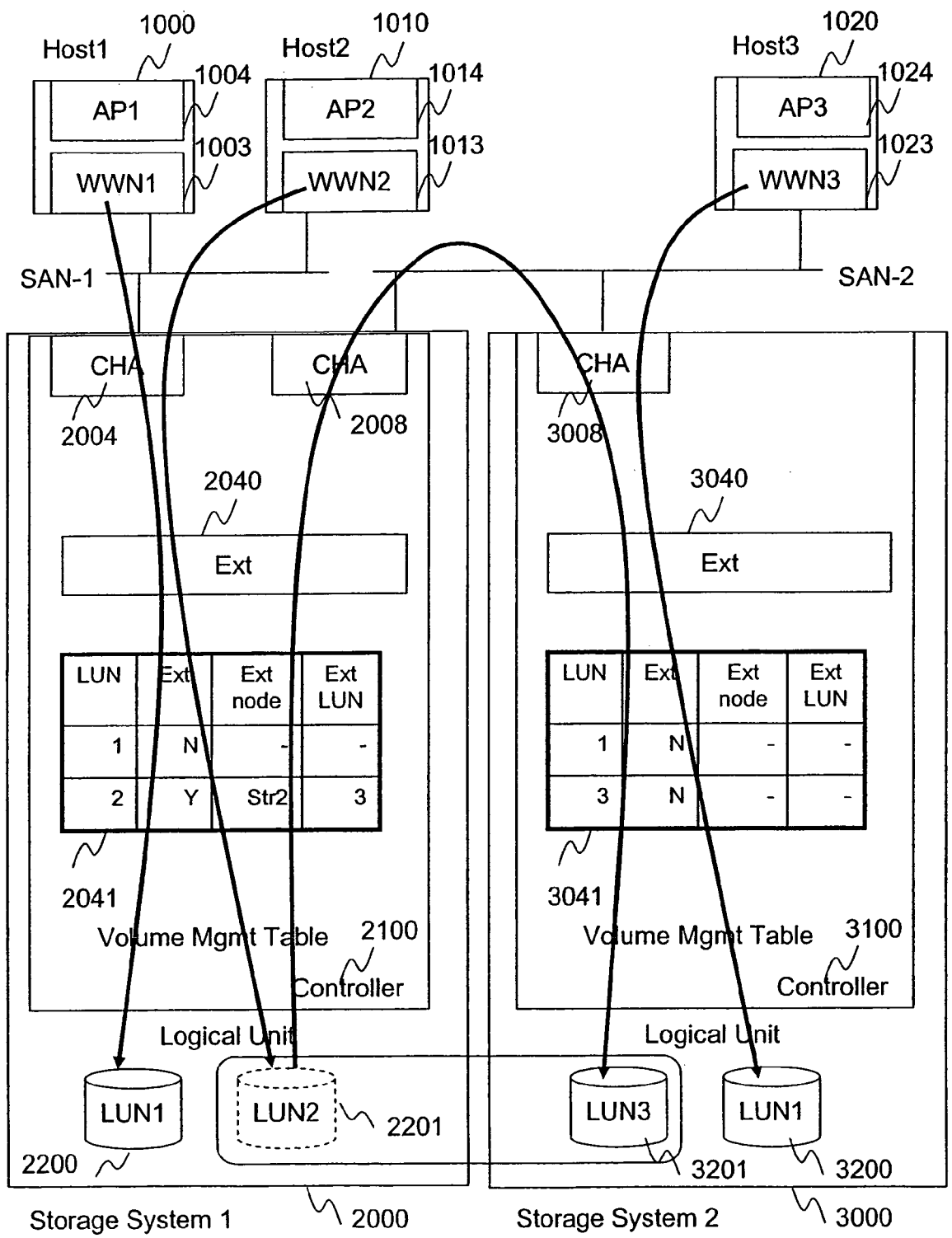
FIG. 2 is a conceptual diagram of a data write operation.

In the first implementation of the invention, a technique for providing prioritized port control to the external storage system is provided. This will be explained in conjunction with FIGS. 2 through 8. FIG. 2 is a conceptual diagram of a typical prior art data write operation involving an external storage system 3000. In FIG. 2 it is assumed that volume mapping has been completed, i.e., that the relationship of volumes in storage system 2000 to volumes in storage system 3000 has been defined. Thus, for example, volumes in system 3000 which mirror those in volume 2000 are established. The volume mapping is performed by an application on the host 1000 or by volume management software on a storage management server. To perform this operation, the external volume management module 2040 is invoked to set up the volume mapping information, and this information is stored in the volume management table 2041.

A typical volume management table is depicted in FIG. 2. The table 2041 includes a logical unit number (LUN), and an indication of whether a virtual volume (Ext) for that LUN is provided. (Not all volumes in storage system 2000 are mapped to corresponding volumes in storage system 3000. Some may be unmapped or mapped to other storage systems.) If the volume is mapped, however, than an external storage address (Ext NODE) is indicated and an external logical unit (Ext LUN) is provided. Thus, as shown in FIG. 2, in that example, LUN2 is mapped to LUN3 in the external storage system 3000.

Other information also can be registered in the volume management table. In the diagram, LUN1 on storage system 2000 is a real volume, meaning that I/O operations are processed in this volume, and not forwarded to the external system 3000. On the other hand LUN2 on storage system 2000 is a virtual volume. This means that I/O operations to LUN2 are forwarded to the external storage system 3000. Both LUN1 3200 and LUN3 3201 on storage system 3000 are real volumes. LUN3 3201 is associated with virtual volume 2201. Thus, data written on LUN2 2201 are forwarded to LUN3 3201 at an appropriate time (which can be synchronous or asynchronous with the writing of volumes in storage system 2000 depending upon the particular implementation.) It is possible to forward every operation, or to store several operations and then forward the stored operations.

In FIG. 2 the solid lines represent data flow. For example, applications program 1 1004 on host 1000 writes data to LUN1 2200 on storage system 2000. Applications program 2 1014 on host 1010 writes data on to LUN2 2201 on storage system 2000. Then the data is forwarded to LUN3 3201 on storage system 3000. In a similar manner applications program 3 1024 on host 1020 writes data on to LUN1 3200 on storage system 3000. Note that the volume management table 3041 does not reference any further external storage system.

Figure 3:
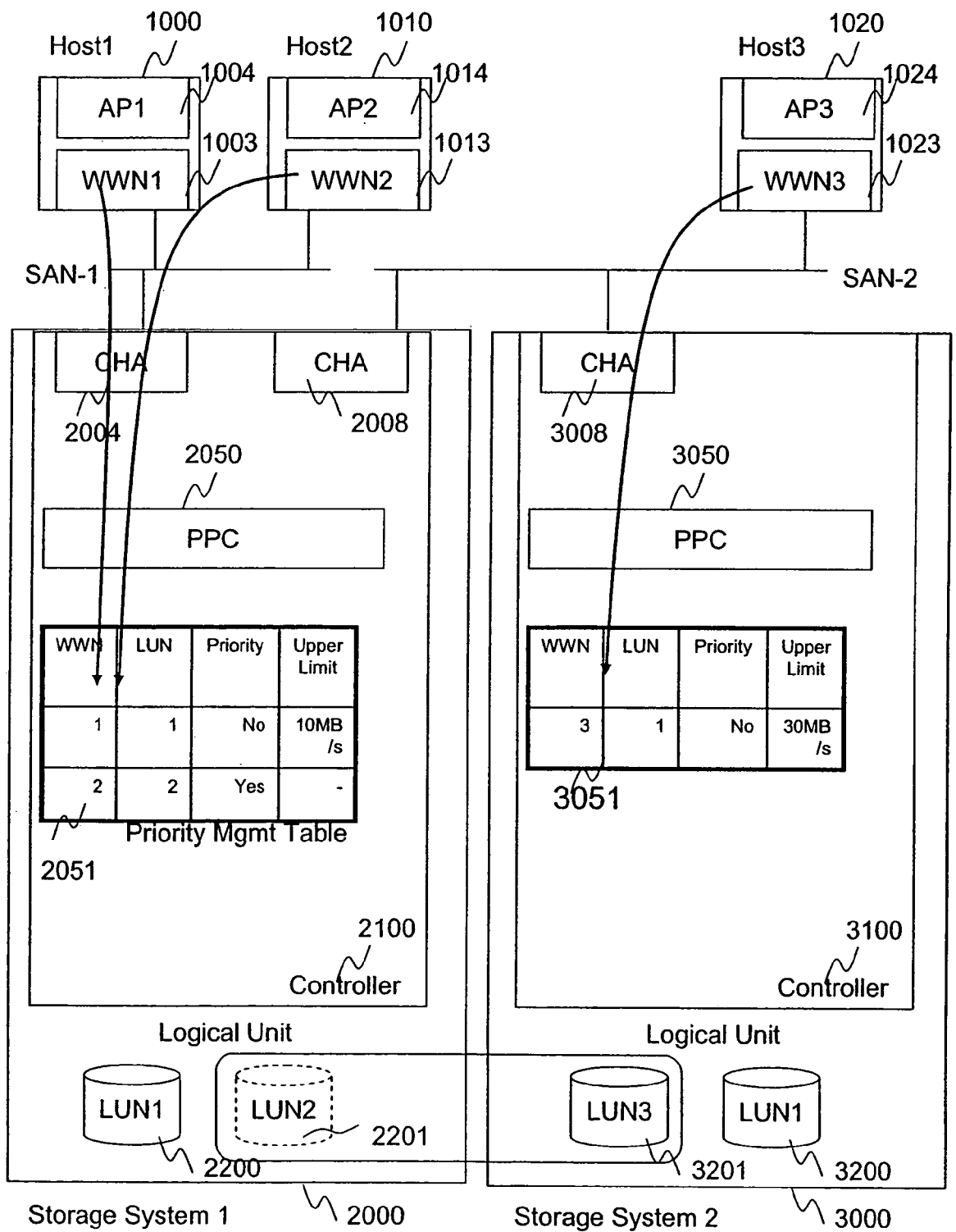
FIG. 3 illustrates a port priority set up.

FIG. 3 is a diagram illustrating a port priority setup configuration system to provide port priority control. Application program such as 1004 and 1014 can invoke the Prioritized Port Control (PPC) module 2050 on storage system 2000. This enables establishing priorities for actions regarding some of the LUNs. In the example of FIG. 3, AP1 has access to LUN1, while AP2 has access to LUN2, which is a virtual volume. AP1 uses as its interface, worldwide name (WWN) 1003, while AP2 uses interface WWN2 1003. These interfaces are connected through channel 2004 on storage system 2000. Hypothetically, in FIG. 3 applications program 2 represented by port WWN2 is given more priority than AP1 and port WWN1. (Note the "Yes" in the priority column.) In the priority management table 2051, WWN1 is shown as having priority for CHA 2004 of up to 10 megabytes per second. AP2 has prioritized access, but with no limit of its throughput.

In FIG. 3 the performance parameter of throughput is used for priority as the controlled parameter, however, one can appreciate that I/O per second, delay or any other appropriate performance parameter could be employed instead, or in combination. The port priority information is stored in the priority management table 2051. That table typically includes the worldwide name, the logical unit number, whether that worldwide name has a prioritized access, and usually another indication of performance. Of course other information can also be registered in the PMT 2051. Based on the information in this table, the port control module 2050 monitors I/O through the channel 2004 and controls the I/O performance. In the similar manner, in storage system 3000, applications program 3 on host 1020 access LUN1 with a maximum throughput of 30 -megabytes per second through channel 3008.

Figures 4, 5:
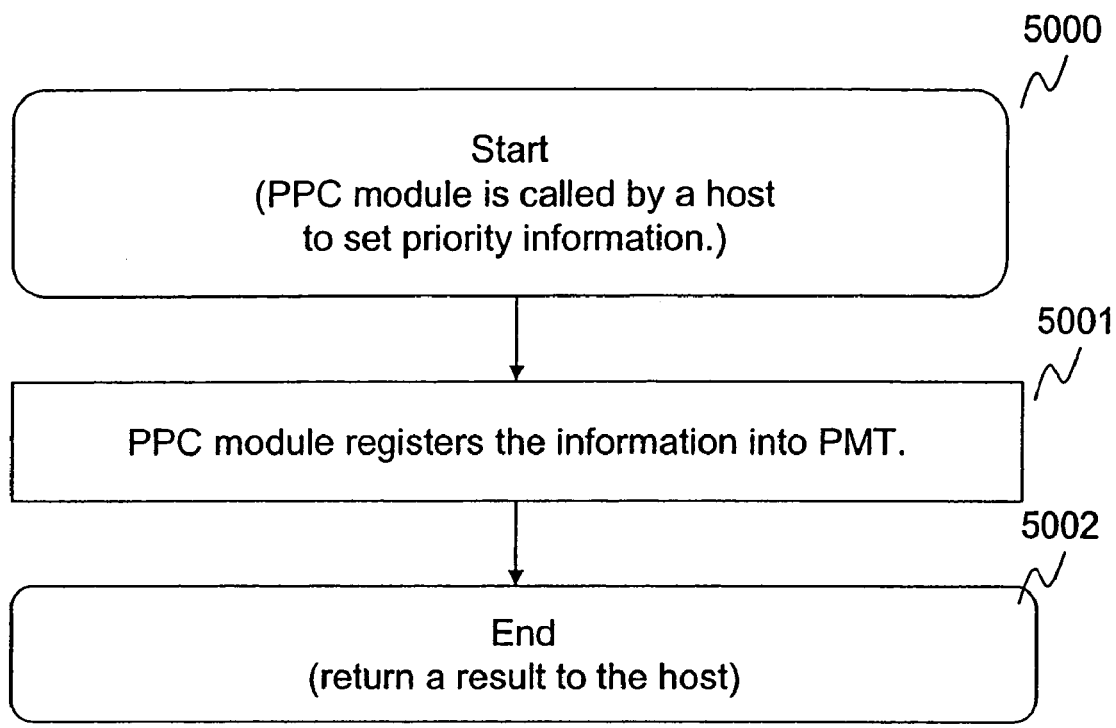
FIG. 4 is an example of the flow of a port priority setting.
FIG. 5 illustrates a priority management table.

FIG. 4 is a flow chart illustrating the process of port priority setting. After an initialization step in which the PPC module is called by the host to set priority information 5000, the information is registered into the priority management table 2051 at step 5001. The result is confirmed to the host at step 5002. FIG. 5 is the diagram illustrating the priority management table 2051.

Figure 6:
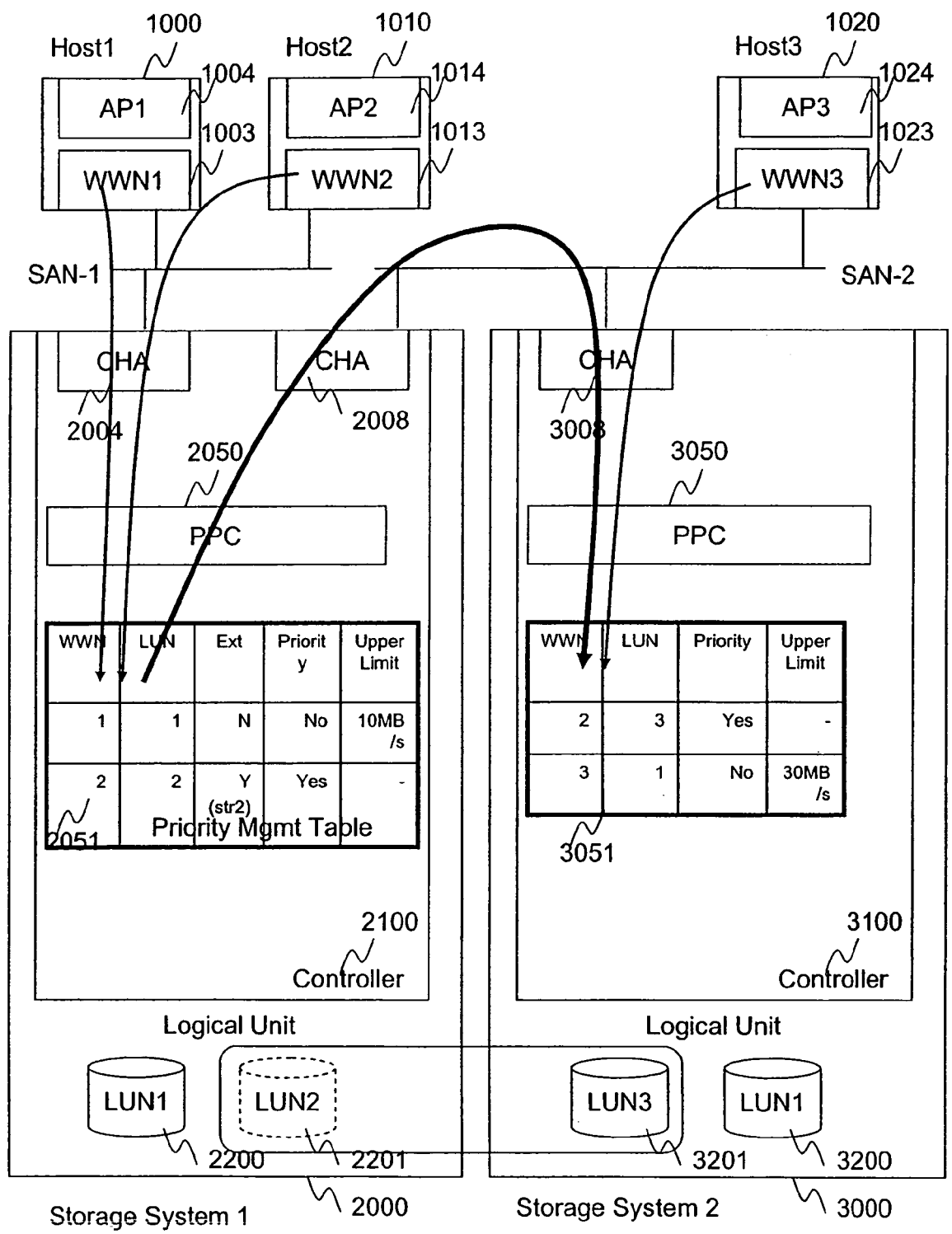
FIG. 6 illustrates a preferred embodiment of a prioritized port control.

In the system described immediately above with respect to FIG. 4, the priority setting for LUN2, which is a virtual volume, cannot be inherited by the external storage system. In particular, the access from LUN2 2201 on storage system 2000 to LUN3 3201 on storage system 3000 through channel 3008 does not have any priority, even if the access to LUN2 2201 on storage system 2000 has a high priority. FIG. 6 is a diagram illustrating implementation of a prioritized port control for an external storage system. As shown by FIG. 6, the priority setting of LUN2 2201 in PMT 2051 is forwarded to the external storage 3000 where it is given a priority by being placed in a priority management table 3051. Note that table 3051 shows LUN3 with a priority and LUN1 with no priority. FIG. 7 is an expanded view of the priority management table 2051 shown in FIG. 6. Also shown in FIG. 7 is the association with LUN3 in storage system 2. The mechanism for providing this priority and having it inherited in the external system will be discussed next. An important aspect of the implementation is the addition of a column "External" (abbreviated "Ext" in FIG. 6) to the priority management table 2051.

Figure 8:
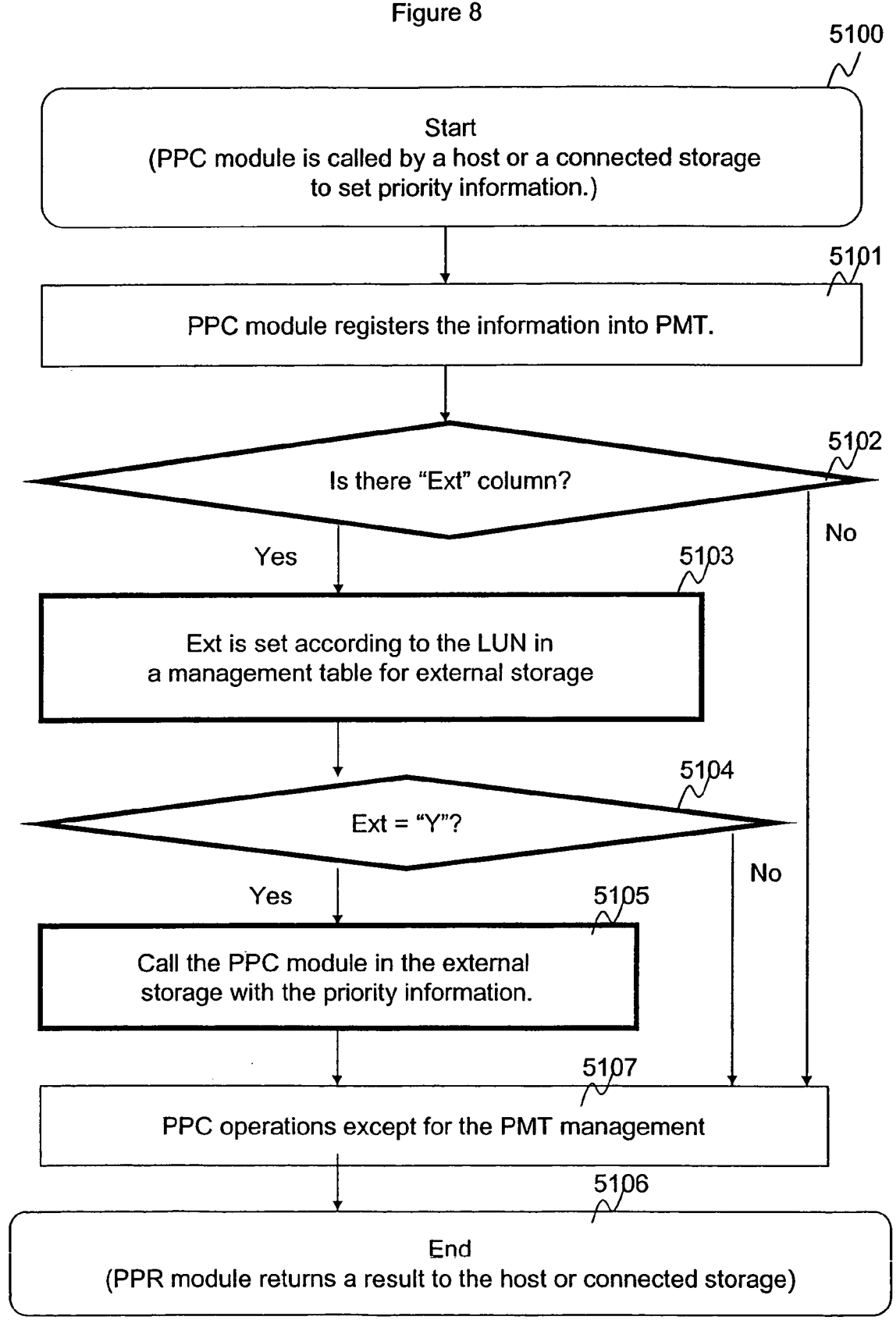
FIG. 8 is a flow chart a priority inheritance mechanism.

FIG. 8 is a flow chart of the priority inherence mechanism for a prioritized port control module. The particular steps in FIG. 8 are discussed next. At step 5100 the PPC module 2050 (FIG. 6) is invoked by an application system on a host or by another storage system to establish priorities. In this process, parameters are passed from the application system to the PPC module, and those parameters preferably include the worldwide name of the host upon which the application resides, the LUN which the applications accesses, a flag to designate either priority access or non-priority access, and a maximum throughput for non-priority accesses.

Next, at step 5101 the PPC module registers these parameters in a new priority management table such as depicted in FIG. 7. (If the priority setting request is not being made for the first time, it means there is already an entry in the PMT, and thus, there are at least two options. In the first option the request can be rejected. In the second option the previous setting can be overwritten. Either approach is satisfactory, and the system can be implemented either way.) At step 5102 a determination is made as to whether there is a "external" (Ext) column in the PMT. In the implementation discussed here, the Ext column has been added. In the event-that one is not present, the flow shifts to step 5107 and all normal PPC operations, except for PMT management, are carried out. These steps assure that non-compliant hardware, i.e. hardware without an Ext column in its PMT, is handled in accordance with normal procedures and does not introduce an error.

If an Ext column is present, flow shits to step 5013 and the Ext column is filled with information according to the information from the volume management table as used by the external storage management module. If there is only a local volume a "No" is provided (meaning no management of an external storage system is required), while if there is an external volume, a "Yes" is provided. The worldwide name and LUN of the external storage are also provided. (Of course the Ext column is not essential for implementing the system described herein.) Without the Ext column, the PPC module can check to see if the volume is an external volume or not each time by searching the volume management table, although this does introduce additional overhead and delay.

In the next step 5104, the PPC module checks the Ext column associated with the priority setting requests from the application. If the column is "Yes" control moves to step 5105 and if "No" to step 5017. The yes entry in the external column indicates that the LUN is a virtual volume. This causes the PPC module to forward the priority parameters by calling the PPC module in the external storage system. Then the local virtual volume LUN is translated into a corresponding physical LUN in the external system. The SCSI command can be used to perform this operation. When the PPC module on the external storage system receives the request, the priority setting process begins from step 5100.

In this implementation the use of a storage management server or storage management network to transmit the priority is not assumed. This means so-called "in band" communication can be used. Alternatively, however, if a server is used, the PPC module can send the priority information to the server, and then the server can send that information to the external PPC module.

At step 5107 the PPC module finishes its configuration operations except for registration in the PMT table. When the priority setup process finishes, the result (success or fail) is returned to the host or storage system. Thus, if a PPC module does not exist on the external storage system, process 5105 will fail. The existence of the PPC module can be specified in advance, for example as being set by an administrator or user of the storage system. Alternatively the PPC module can call the remote PPC module, and if there is no response, the module can return a fail signal.

In an alternative technique, the storage management server can be used to set the priority of the external storage system through a management interface. This can be done manually by giving the storage manager the ability to set up the priority for both the virtual volume LUN2 2201 and the real volume LUN3 3201. This approach, however, requires more communications among the storage systems and storage management servers, and requires the operations to and from the host to all be made known to the storage management server.

Figure 9:
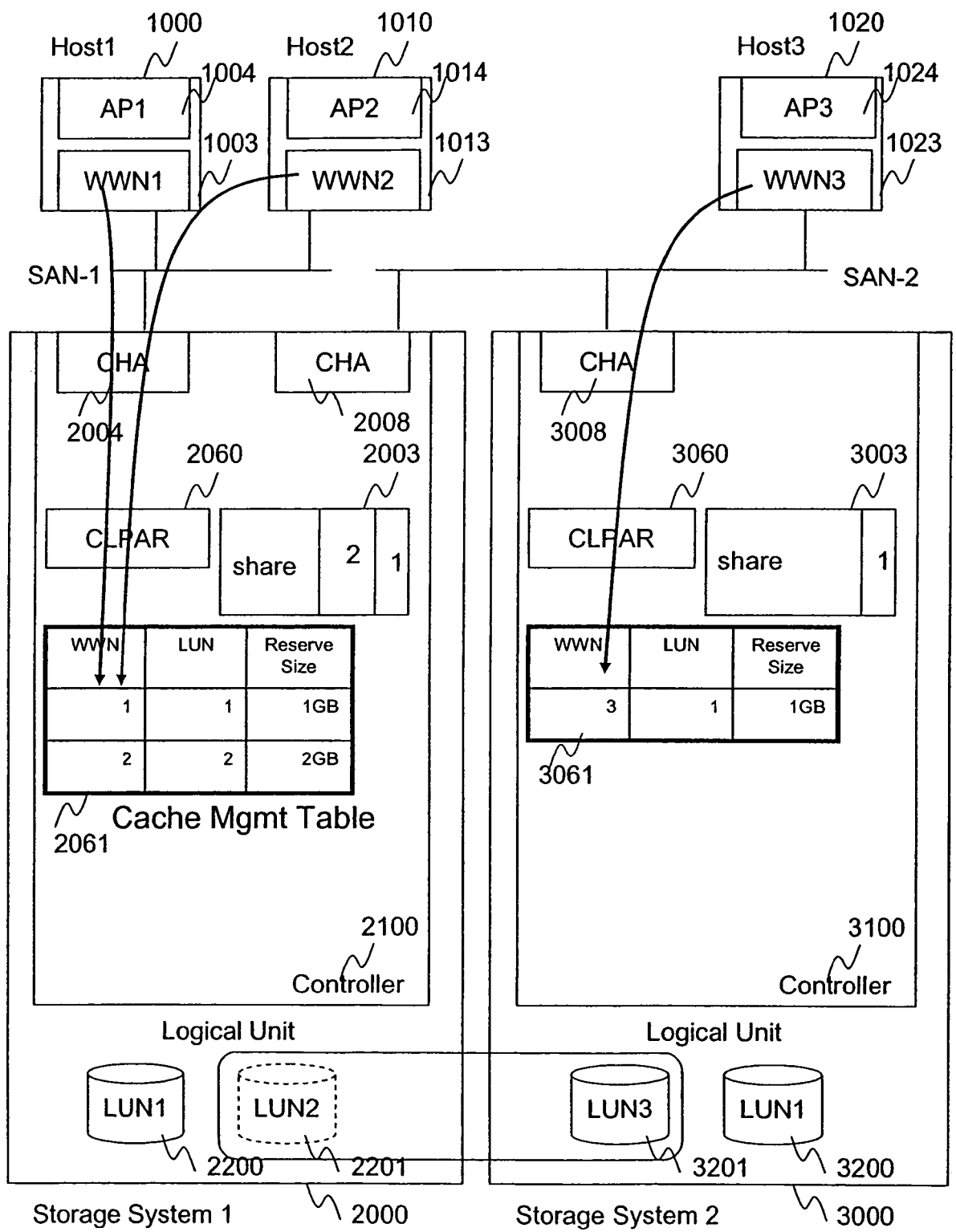
FIG. 9 illustrates a cache LPAR setup.

The foregoing has been a description of a prioritized port control system for implementation with external storage systems. Next, an explanation is provided of how the cache LPAR system configuration settings can be inherited in a similar manner. This description uses the same volume configuration as shown in FIG. 2. FIG. 9 is a diagram presenting an example of the cache LPAR setup for a storage system. Application programs such as 1004 and 1014 invoke the cache LPAR module 2060 on storage system 2000 to reserve portions of the cache for some LUNs. In general, the cache memory on the storage system 2000 and 3000 is shared by all I/O operations. By using the cache LPAR module, however, an amount of the cache in the storage system can be reserved (or partitioned) for a particular application access to a logical unit.

In FIG. 9 application program 1 1000 accesses LUN1 2200 with a cache reservation of one gigabyte, while application program 1014 reserves two gigabytes for the accesses from that program to LUN2. The cache amounts shown in table 2061 reflect these reservations.

Accesses from other applications to some LUNs are not reserved. These accesses then must use the shared area of a cache memory, which may impact performance depending on the particular timing of the accesses. For the cache reservation parameters, not only is the absolute size of the cache memory a possible choice, but also the ratio of cache memory size can be used. For example, one-third of the cache can be reserved for a particular application. The cache reservation information is stored in management table 2061, and typically includes the worldwide name representing the host or application, the logical unit number, and the size of the reservation. Of course, other information can also be registered in this table 2061. Based upon the information in the table, CLPAR module 2060 monitors I/O operations from the applications program and controls the usage of the cache. In a similar manner, in storage system 3000, a management table 3061 has reserved one gigabyte of the cache for accesses to LUN1, associated with applications program 1024.

The cache capacity reservation for LUN2 which is a virtual storage volume, however, cannot be inherited by the external storage 3000. Thus, accesses from LUN2 2201 on storage system 2000 to LUN3 3201 on storage system 3000 through the channel do not include cache reservations.

Figure 10:
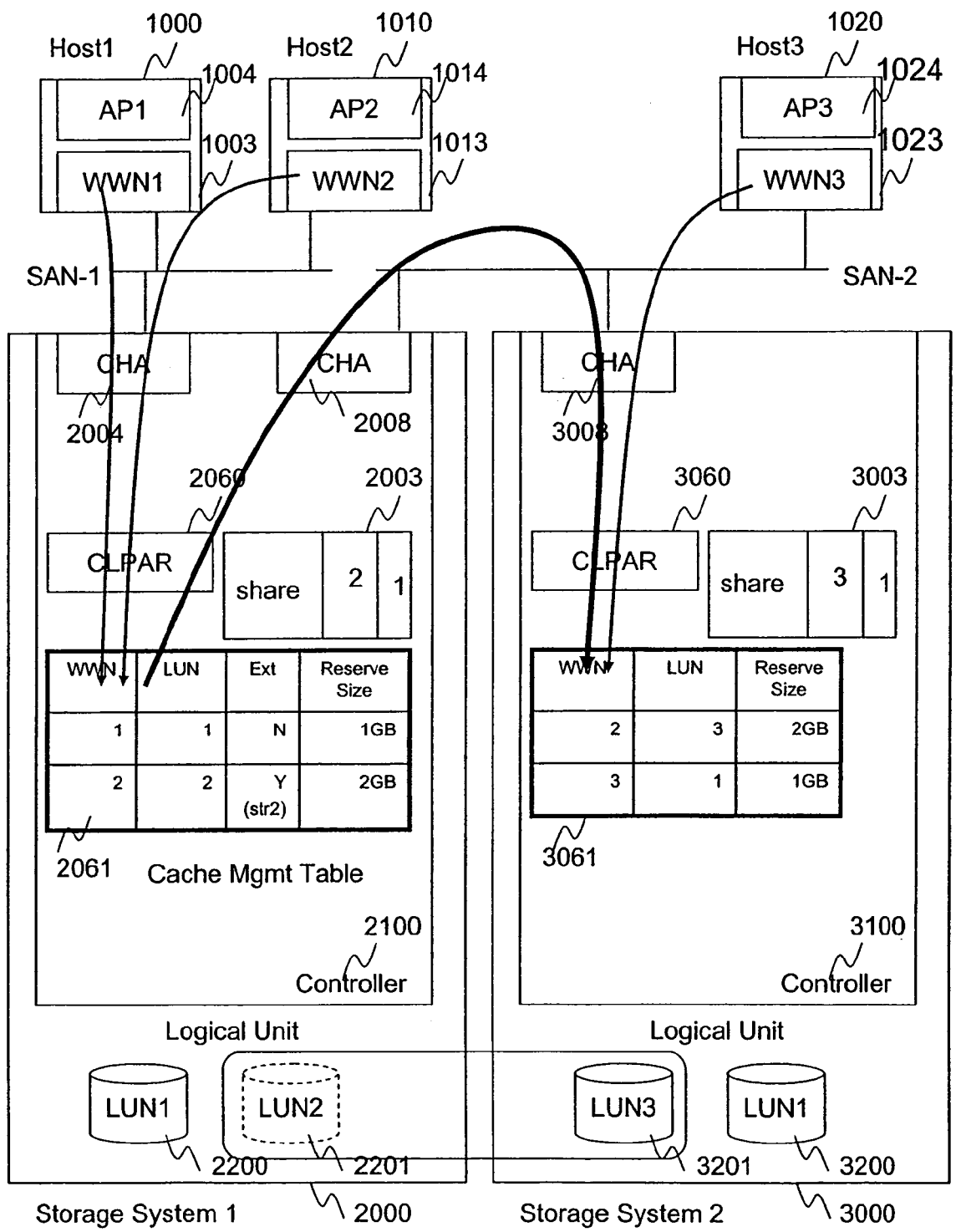
FIG. 10 is a diagram of a system for assuring the cache LPAR.
Figure 11:
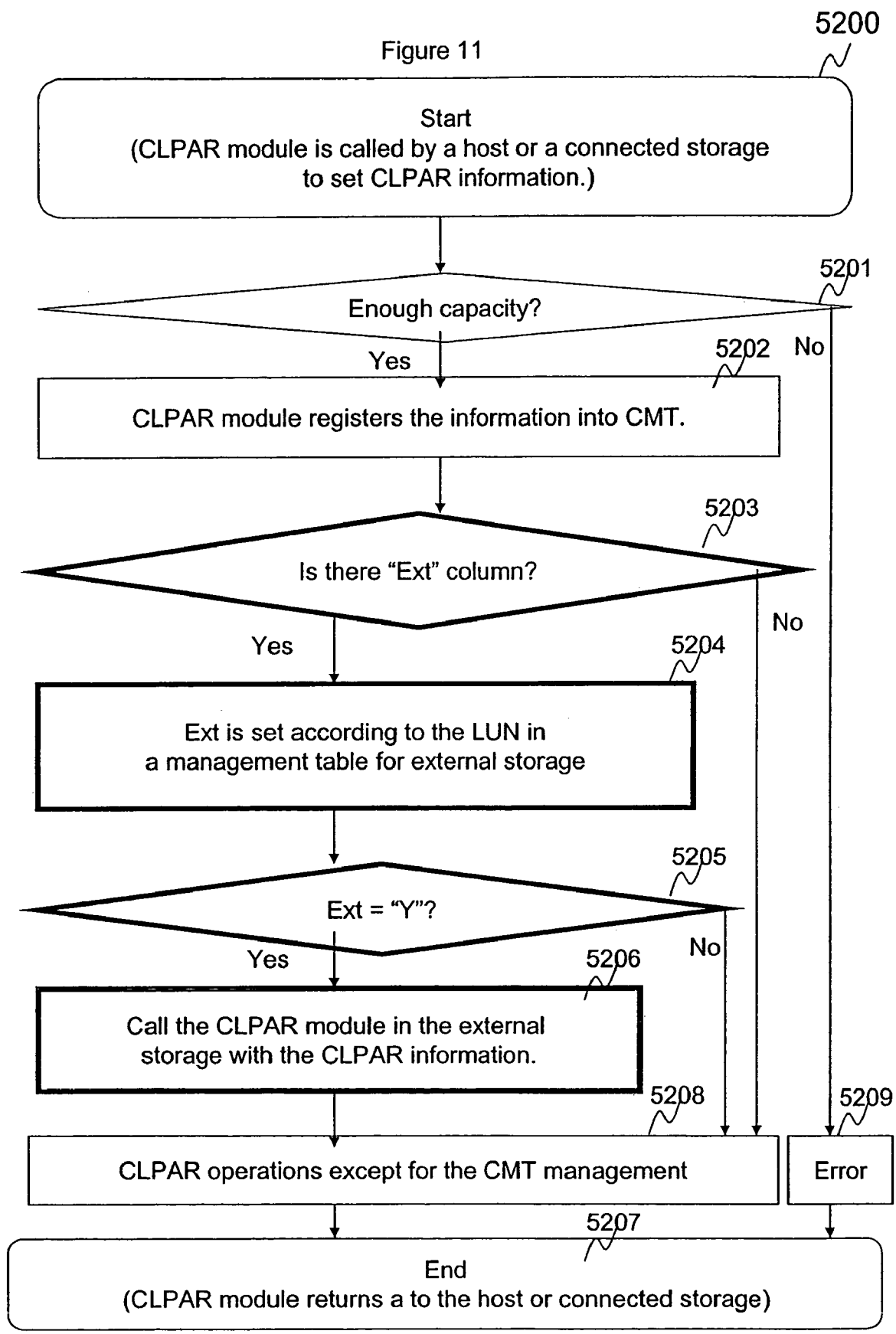
FIG. 11 is a flow chart of the cache LPAR inheritance mechanism.

FIG. 10 is a diagram similar to FIG. 9, but illustrating how the cache capacity reservation for LUN2, which is a virtual volume, can be forwarded to the external storage 3000 to provide a reservation there. In particular, the reservation set by applications program 1014 is forwarded to the external storage 3000. The method by which the reservation is forwarded is shown in more detail in FIG. 11, however again the provision of an "Ext" column is important. FIG. 11 describes the flow of the cache LPAR inheritance mechanism for the CLPAR module 2060.

To start the process, the CLPAR module is invoked by an application program on a host or another storage system to set up the cache LPAR. This is shown at step 5200. In this process, parameters are passed from the application system to the CLPAR module. Typically the parameters include the worldwide name of the host upon which the application resides, the logical unit number which the application accesses, and the cache capacity for the access. At step 5201 the CLPAR module checks to determine if there is enough capacity in the cache for the reservation. If there is not, an error is reported at step 5209. Assuming there is enough capacity for the reservation requested, the module registers the information into the cache management table at step 5200.

In a similar manner to the steps described above for controlling port priority, the system then checks to determine whether there is a column "Ext," as shown by step 5203. If there is, the column is filled according to the information from the volume management table which is used by the external storage management module. See step 5204. For a local volume the column is set to "No," while for an external column, the setting is "Yes." The worldwide name and the logical unit number of the external storage are also provided as shown by step 5204. The module then checks the external column at step 5205 to determine subsequent operations. If the column is "Yes" this means the LUN is a virtual volume. In that case, the CLPAR module forwards the parameters by calling the CLPAR module on the external storage. Typically a SCSI command is used for this operation. In this case the virtual volume's logical unit number must be translated into the corresponding logical unit number in the external storage system by using the volume management table managed by the external storage management module. When the CLPAR module on the external storage receives the request, the cache LPAR setting process begins as shown by step 5206.

At step 5208 the CLPAR module finishes its configuration except for registering the data in the cache management table. The setup process then completes, and the result (success or fail) is returned to the host for the storage system. If the CLPAR module does not exist in the external storage system, the process at step 5206 fails. The presence or absence of the module is typically set in information provided by administrators or users of the storage system. Alternatively, if one module calls a remote module, and if there is no response or an error, then the CLPAR module returns information that the external module is not present.

Contrary to the prioritized port control operation, it is possible to cancel the CLPAR setting for the virtual volume, meaning that the cache is only reserved in the external storage. To do that, process 5206 receives a successful reply and the CLPAR module deletes the reservation information in the cache management table.

In an alternative approach, the storage management server may be used to set up the cache reservation through a management interface. In this approach, the storage manager sets the reservation for both virtual volume 2201 and real volume 3201 manually. Of course, it is also possible to set the parameters automatically, however this requires more communications between the storage system itself and the storage. In this case, all the operations to and from the host are storage system passed through the storage management server.

Figure 12:
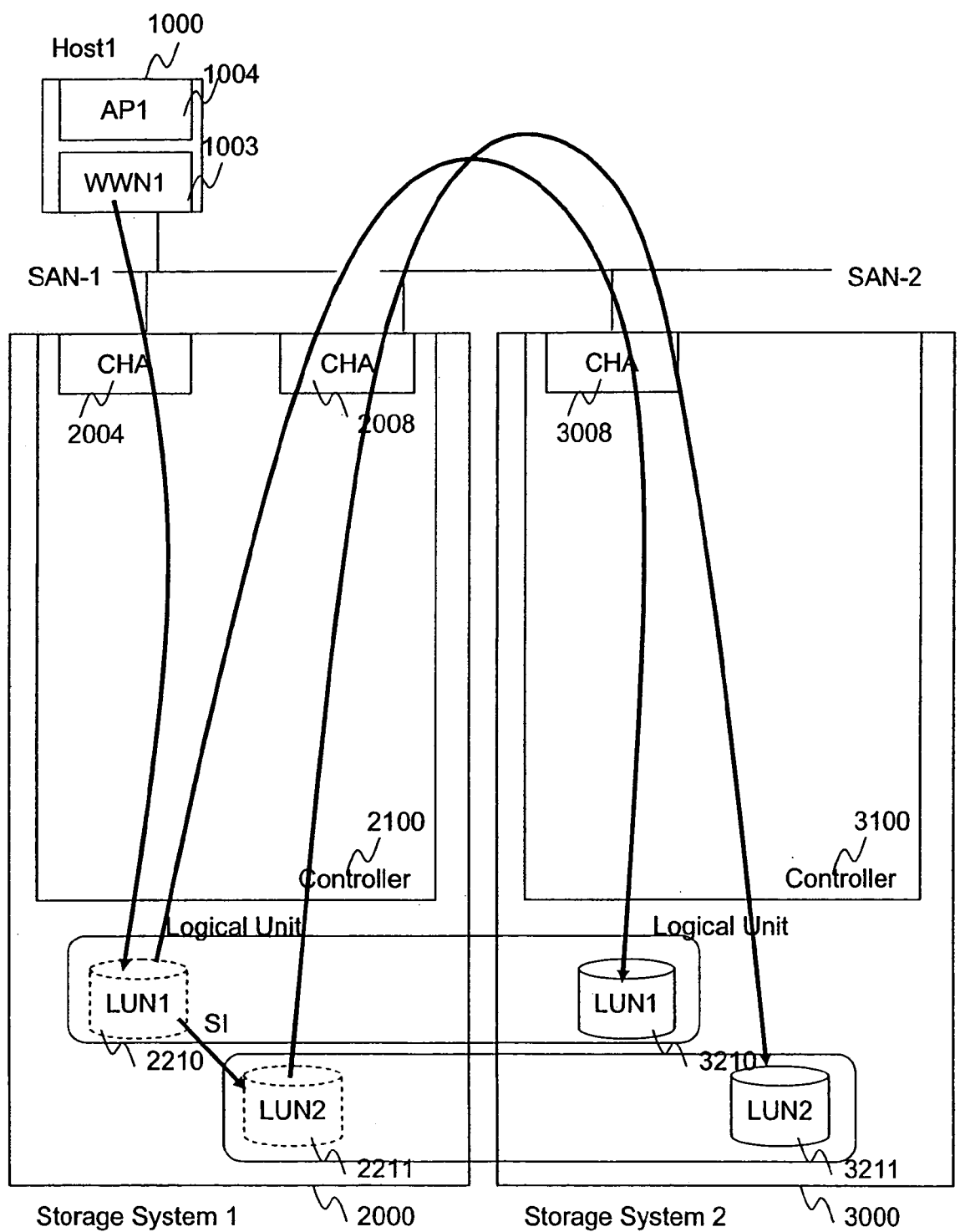
FIG. 12 is conceptual diagram of a local copy operation.

Another approach for assuring performance of external storage networks is to delegate the local copy operation to the external storage when both the source and destinations are present in the external storage. Herein this copy mechanism is referred to as "shadow imaging." FIG. 12 is a conceptual diagram of a local copy operation within a primary storage system. In FIG. 12 we assume that the volume mapping has been completed, i.e., that the relationship of volumes in storage system 2000 and storage system 3000 has been established. In a similar manner to that described above, the volume mapping is performed by an application on a host, for example host 1000, or by volume management software on a storage management server. The external volume management module is invoked to set up the volume information, and the volume mapping information is stored in the volume management table 2040 (see FIG. 1). This table includes information about the logical unit number, whether that LUN is a virtual volume or not, the external storage address, and the external logical unit n umber. Of course, other information can also be placed in the volume management table. In the example, both LUN1 2210 and LUN2 2211 from the storage system 2000 are virtual volumes, meaning that I/O operations are forwarded to the external storage system 3000 where those operations are carried out with real volumes LUN1 3210 and LUN2 3211. Volume 3210 is associated with virtual volume 2210, and volume 3211 is associated with virtual volume 2211. Then, data written to volume 2210 and to volume 2211 are forwarded to volumes 3210 and 3211, respectively with appropriate timing (synchronous or asynchronous).

In FIG. 12 solid lines represent this data flow. For example, application program 1004 on host 1000 writes data onto volume 2210 and that data is forwarded to volume 3210. In addition to this external copy operation, local copy setting is also illustrated by FIG. 12. In particular, volume 2210 is shown as being mirrored to volume 2211. As a result, the data written to volume 2210 is copied to volume 2211, but because volume 2211 is a virtual volume, the copied data is forwarded to volume 3211.

Figure 13:
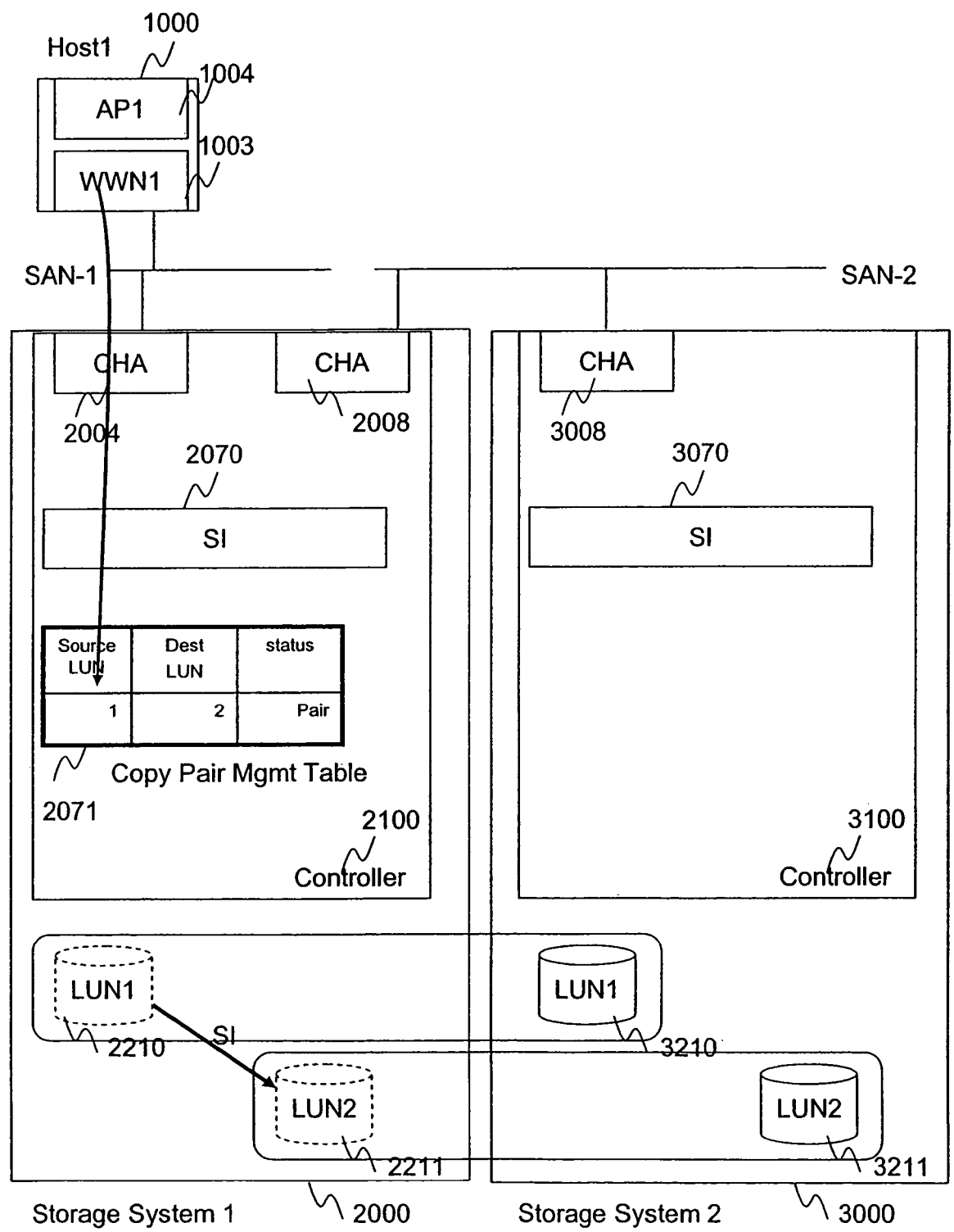
FIG. 13 illustrates a pair create operation.

FIG. 13 is a diagram illustrating an example of a pair create operation for the shadow image. As depicted there, an applications program 1004 invokes a shadow image module 2070 on storage system 2000 to create a copy pair. The pair information is stored in the copy pair management table (CPMT) 2071. After finishing the pair create operation, based on the information in that table, the shadow image module 2070 monitors write operations to LUN1 2210, and copies those write operations to LUN2 2211. In this system, the pair information relationship between 2210 and 2211 is not inherited by the external storage system 3000.

Figure 14:
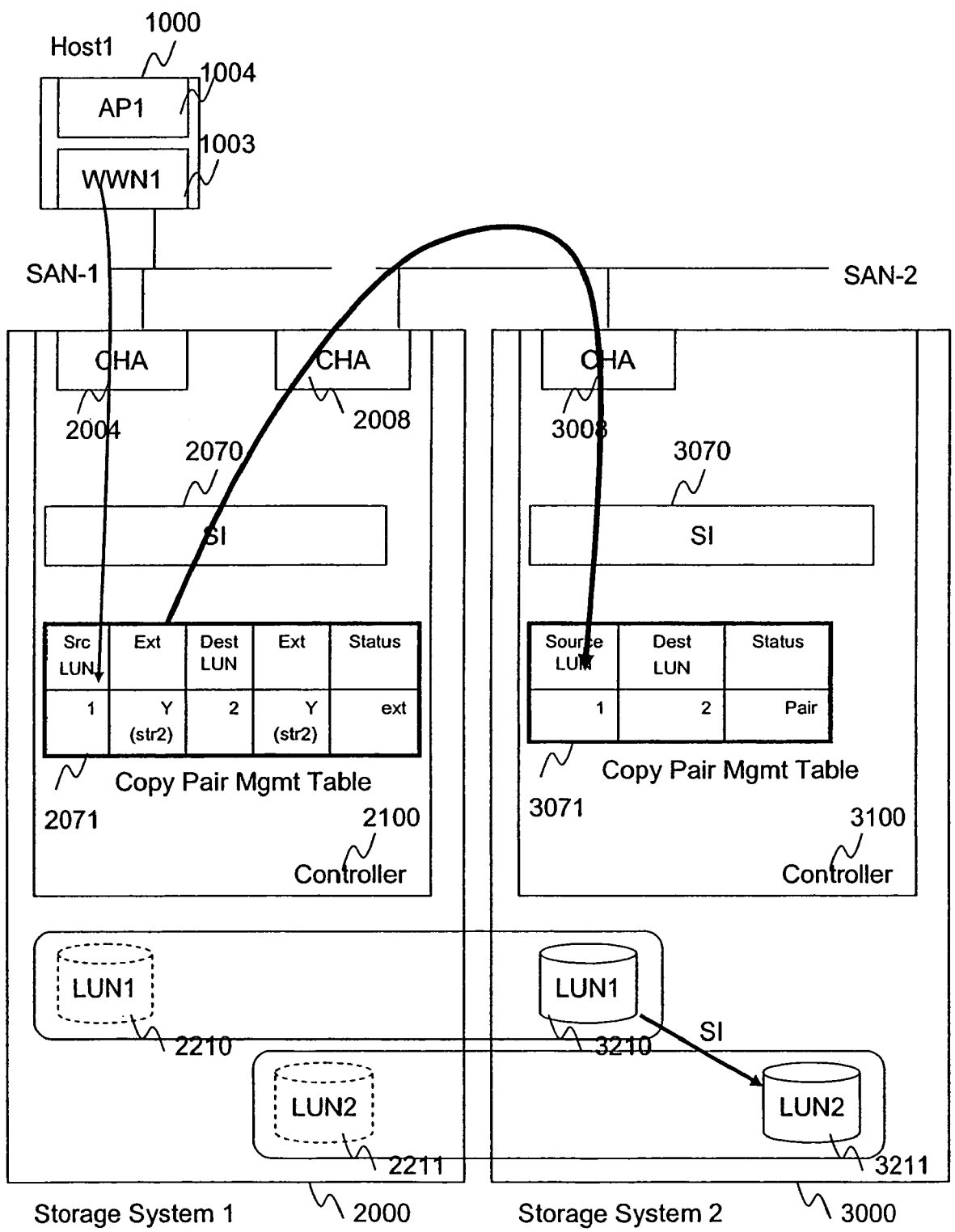
FIG. 14 is a conceptual diagram of a pair create process for a shadow image.

FIG. 14 is a diagram illustrating a pair create process for shadow images in one embodiment of this invention. As depicted there, the pair information is forwarded from storage 2000 to external storage 3000 and the shadow image is performed on the LUNs of the external storage system 3000, not on system 2000. The specific steps by which this process is achieved are described in more detail in conjunction with FIG. 15.

Figure 15:
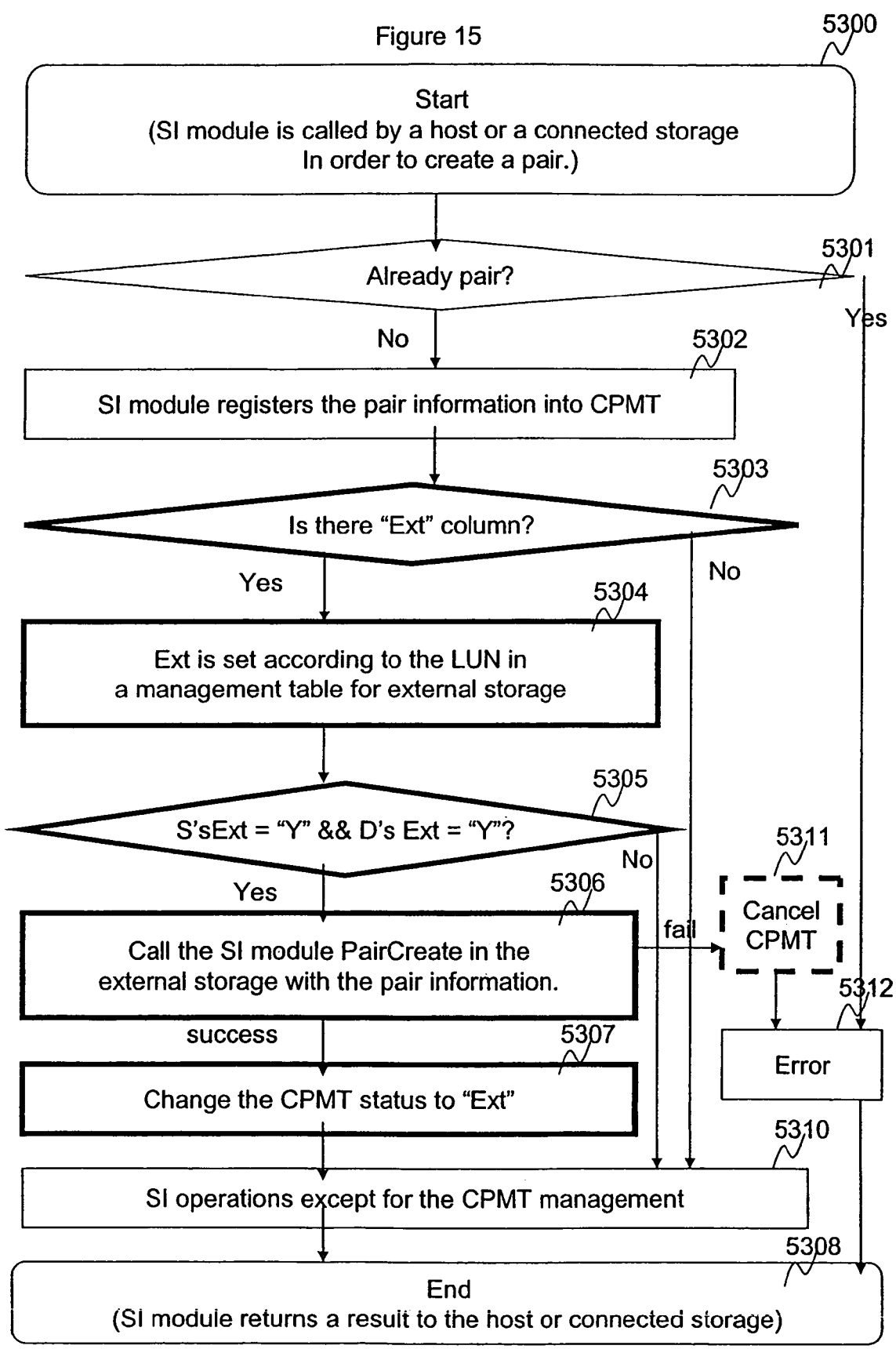
FIG. 15 is a flow chart of a pair information delegating mechanism.

FIG. 15 is a flow chart illustrating the pair information delegating mechanism as discussed above. The process begins at step 5300 when the module is invoked by an application operating on a host or some other storage system, and it is desired to create a pair. As a result of this process, the parameters are passed from the application system to the shadow image module in the external storage system. At step 5301, a determination is first made if the LUNs have already been used as a pair. If they have, an error is returned at step 5312 and the process terminates at step 5308. If they have not been used as a pair, the shadow image module registers the parameters in the copy pair management table 5302.

Then at step 5303, a determination is made whether an external column has been already added to the CPMT. As described above with regard to the cache reservation system, this enables the system to interact with systems in which no Ext column is present. In this situation, the operation just proceeds as it would have before, without regard to an Ext column.

As shown in step 5305, if the Ext column exists, that column is completed according to the information in the volume management table 2040 which is used by the external storage management module. For a local volume, "No" is used meaning there is not an external volume, while for a "Yes" designates an external volume. The worldwide name and LUN of an external storage are also provided, all as shown at step 5304.

At step 5305 the module checks whether the Ext column associated with the LUNs are a pair. If both columns contain "Yes" it means that both LUNs are virtual volumes. In this case the shadow image module forwards the pair create command with the associated LUNs by calling the shadow image (SI) module on the external storage system. The LUNs are found in the volume management table managed by the external storage management module. A SCSI command can be used for this operation. When the SI module on the external storage receives the request, the pair create process starts from step 5300.

If it is desired to stop mirroring (split) or to handle other commands to the storage system which have virtual volumes, the SI can also register new status "Ext" in the status column for the pair as shown by step 5307. Once this step is completed, the SI module finishes its configuration for copy operations, except for the registration in the CPMT then the pair create process finishes. The result is returned to the host for storage system. As mentioned above, if the SI module does not exist on the external system, the process fails at step 5306. In this case the result is an error and the SI module cancels the registration information in the CPMT, as per step 5311. The process step 5311 can be omitted, and if so, then the mirroring between the virtual LUNs continues to work even if the shadow image operation fails.

Figure 16:
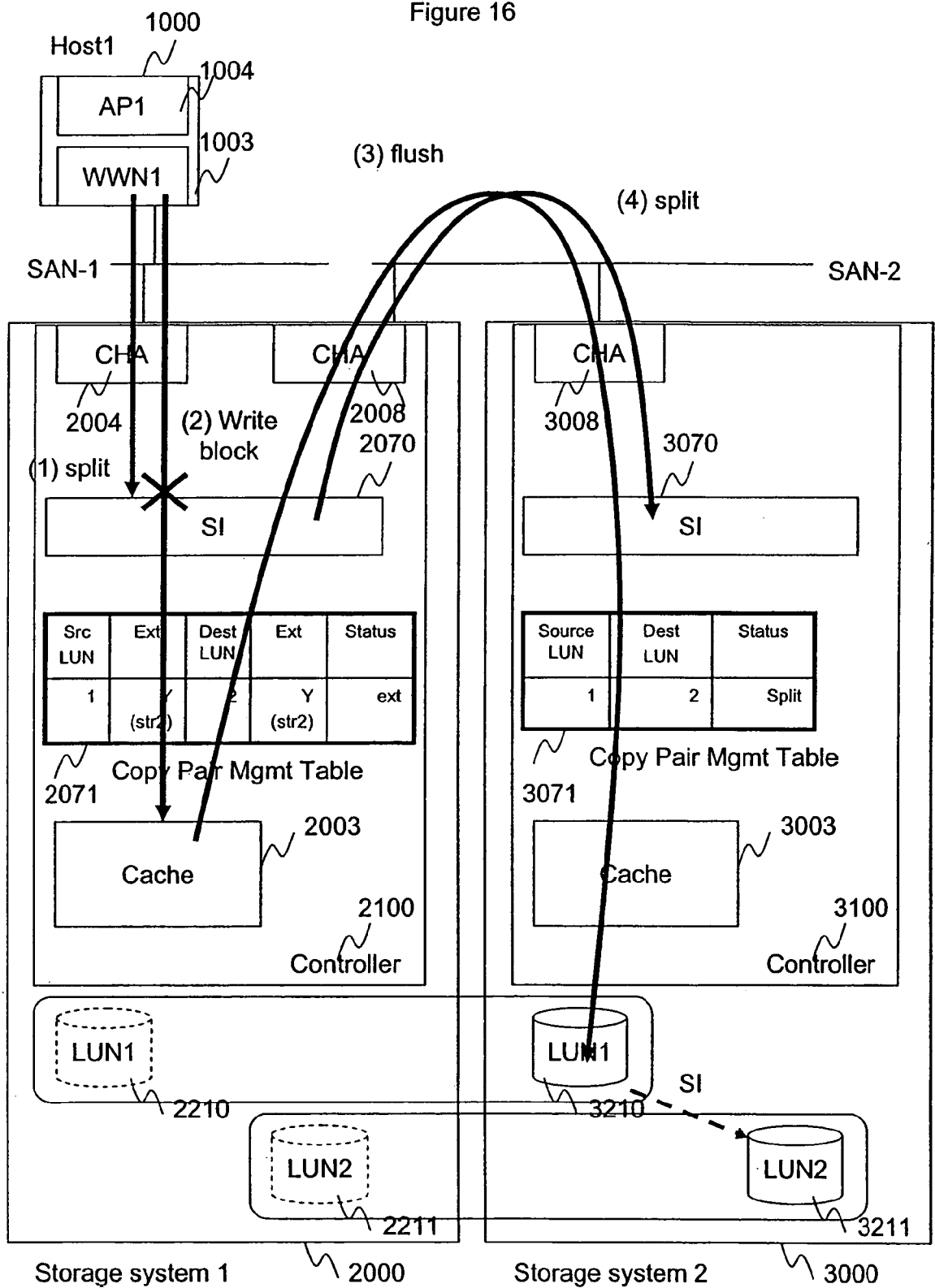
FIG. 16 is a conceptual diagram of a split process for shadow image.

In addition to the pair create operation, the split operation must also be forwarded to the external storage system. The conceptual diagram of this operation is shown in FIG. 16. The processes is invoked by an applications program, such as 1004 invoking a shadow image module 2070 from storage system 2000 to split an LUN pair. After receiving the split operation, the shadow image module blocks input output operations to the source and destination volumes until the split operation is completed.

During this process there is a possibility that data on the cache 2003 has yet to be written to the volume 2210. To prevent loss of this data, upon invoking the process, the data on the cache is flushed, ultimately to LUN 3210 on the external storage unit. Then the split operation is forwarded to the external storage and stored in the copy pair management table. The data flow as illustrated by FIG. 16.

Figure 17:
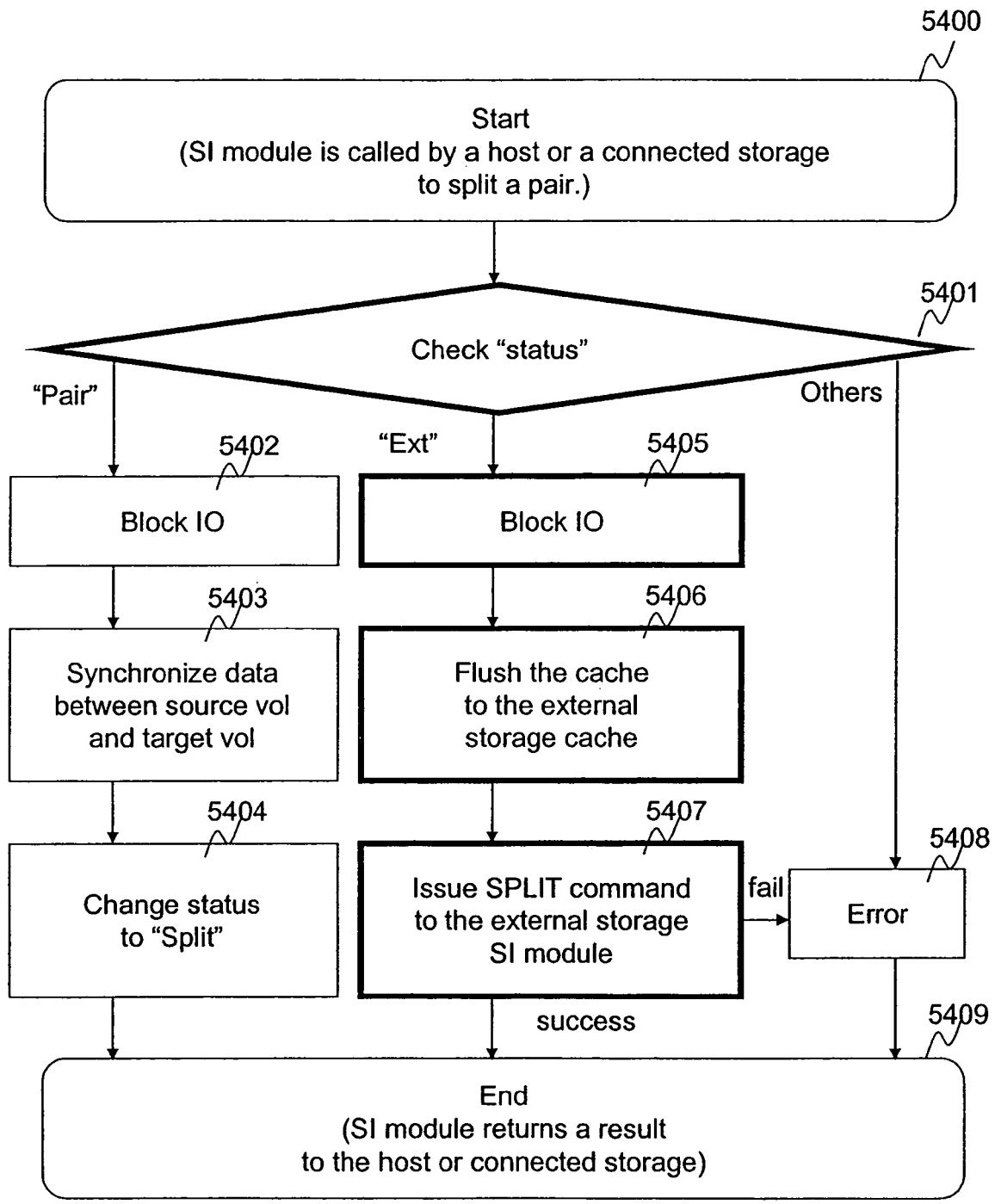
FIG. 17 is a flow chart of a split operation delegating mechanism.

FIG. 17 is a flow chart illustrating the split operation on the shadow image module. As shown in step 5400 the module is invoked by an application executing on a host or another storage system to split a pair. In this process the parameters are passed from the application system to the shadow image module and include a source LUN and a destination LUN. Following that operation the shadow image module checks the status column of the copy pair management table at step 5401. If the column of the LUN pair is "pair" meaning that at least either source or destination volumes reside on the local storage system, the shadow image module blocks I/O operations to the applicable logical units from applications systems, as shown by step 5402. The module then flushes the cache data to the source LUN on the local storage system and then changes the status of the pair to split as shown by step 5404.

On the other hand, if the status check 5401 returns Ext as the status, this means both the source LUN and the destination LUN are on the remote storage system. In this case the shadow image module blocks input/output operations to the applicable LUNs from the applications 5405. Then the shadow image module flushes the cache data to the source LUN on the local storage system and to the remote cache on the external storage system, as shown by step 5406. Afterward, the module forwards the split command to the external storage system, as shown at step 5407. According to the external LUN information stored on the volume management table 2041 and CPMT 2071, the shadow image module will input the external LUNs in the forwarded split command. When the SI module receives the request, the split process begins at step 5400.

Finally, if the status command in neither "pair" nor "Ext," the split command should not be processed and an error returned, as shown by step 5408. If the split process finishes and the SI module does not exist on the external storage system, the whole process fails. To check for the existence of the shadow image module, the module itself can manage the information about whether each storage is aware of the module or not, in advance. This information can be set by the storage administrator or users of the storage system. In an alternative approach the local SI module can call the remote SI module, and if there is no response or if an error is returned, the absence of the SI module can be inferred. In this situation, use of the management table 5409 can be employed.

After a pair is split, an SI command known as "resync" can be used to recreate the pair. This process is almost the same as the normal pair create operation discussed in conjunction with FIG. 15, however, the data must be flushed from the local cache to the volumes to assure no data is lost.

Figure 18:
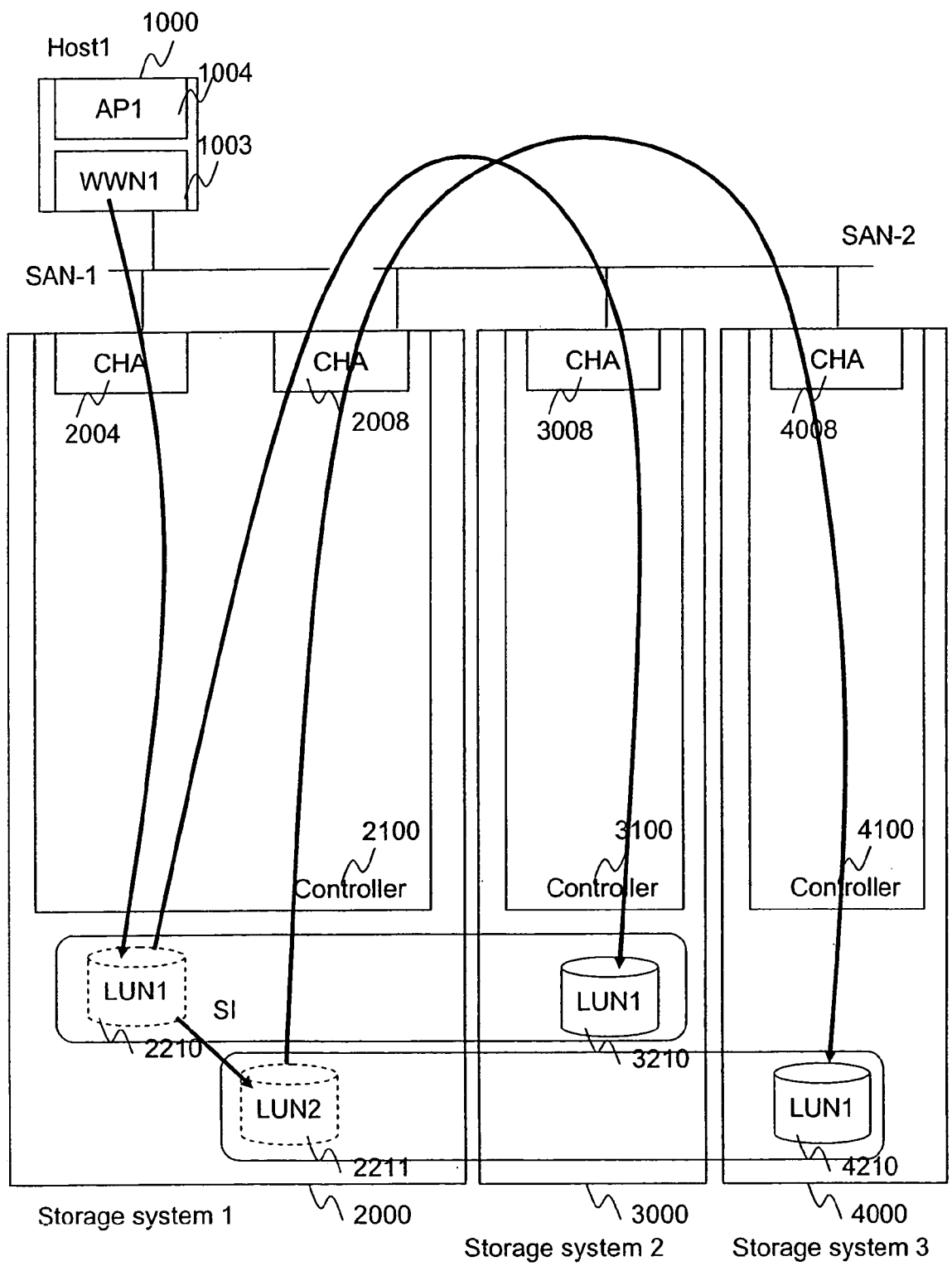
FIG. 18 is a conceptual diagram of a local copy operation with two external storage systems.

It is also possible for the source and destination volumes to be on the external storage system. Furthermore, even if the source and destination volumes are virtual volumes on the same storage system, the corresponding real volumes can be present on different storage systems. A typical configuration is shown in FIG. 18. FIG. 18 is a conceptual diagram of a local copy operation with two external storage systems 3000 and 4000. Again it is assumed that volume mapping has been completed and that information has been stored in a volume management table which includes the logical unit numbers, the presence or absence of virtual volumes, external storage addresses, and external logical unit numbers.

In FIG. 18 both volumes 2210 and 2211 on storage system 2000 are virtual volumes. This means that I/O operations in storage system 2000 are forwarded to the external storage systems 3000 and 4000 as appropriate. Volume 3210 is associated with virtual volume 2210, and volume 4210 is associated with virtual volume 2211. As a result, data written to volume 2210 and 2211 are forwarded to volumes 3210 and 4210, respectively with appropriate timing. In the same manner as with other diagrams herein, the solid lines in FIG. 18 represent data flow. Thus, for example, applications program 1004 writes data to volume 2210 then the data is then forwarded to volume 3210 on the external storage system. In addition, volume 2210 is mirrored to volume 2211, and thereby actually copied to volume 4210.

In the example depicted in FIG. 18 the pair information for the volumes LUN1 and LUN2 is not inherited by the external storage system. In the situation illustrated, the remote copy command must be used in the remote storage systems because the destination volume is present on a different storage system than the source storage system. The assignee of this patent application refers to such technique as "True Copy™."

Figure 19:
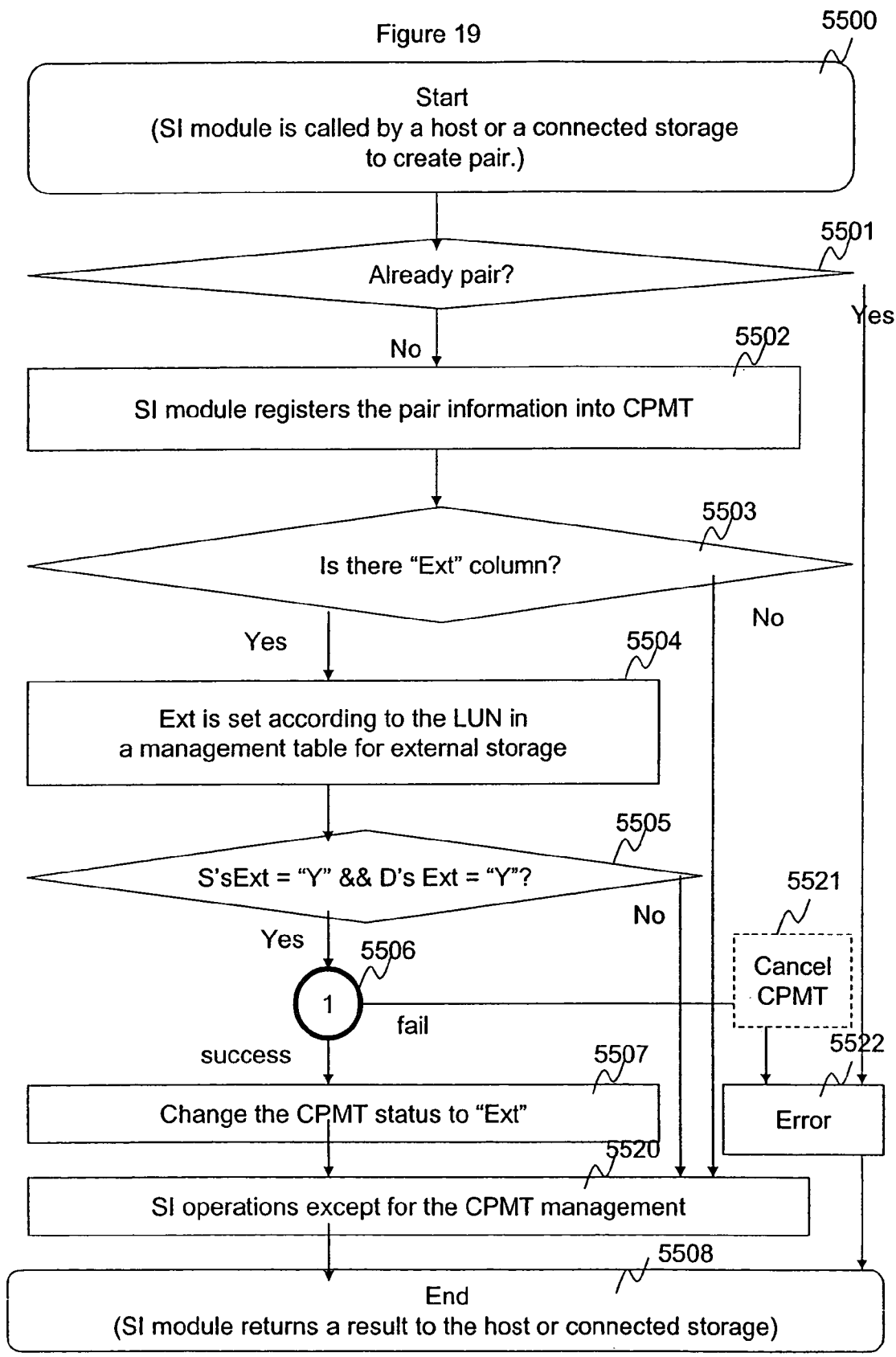
FIG. 19 is a flow chart illustrating the delegating mechanism for the flow of pair information.
Figure 20:
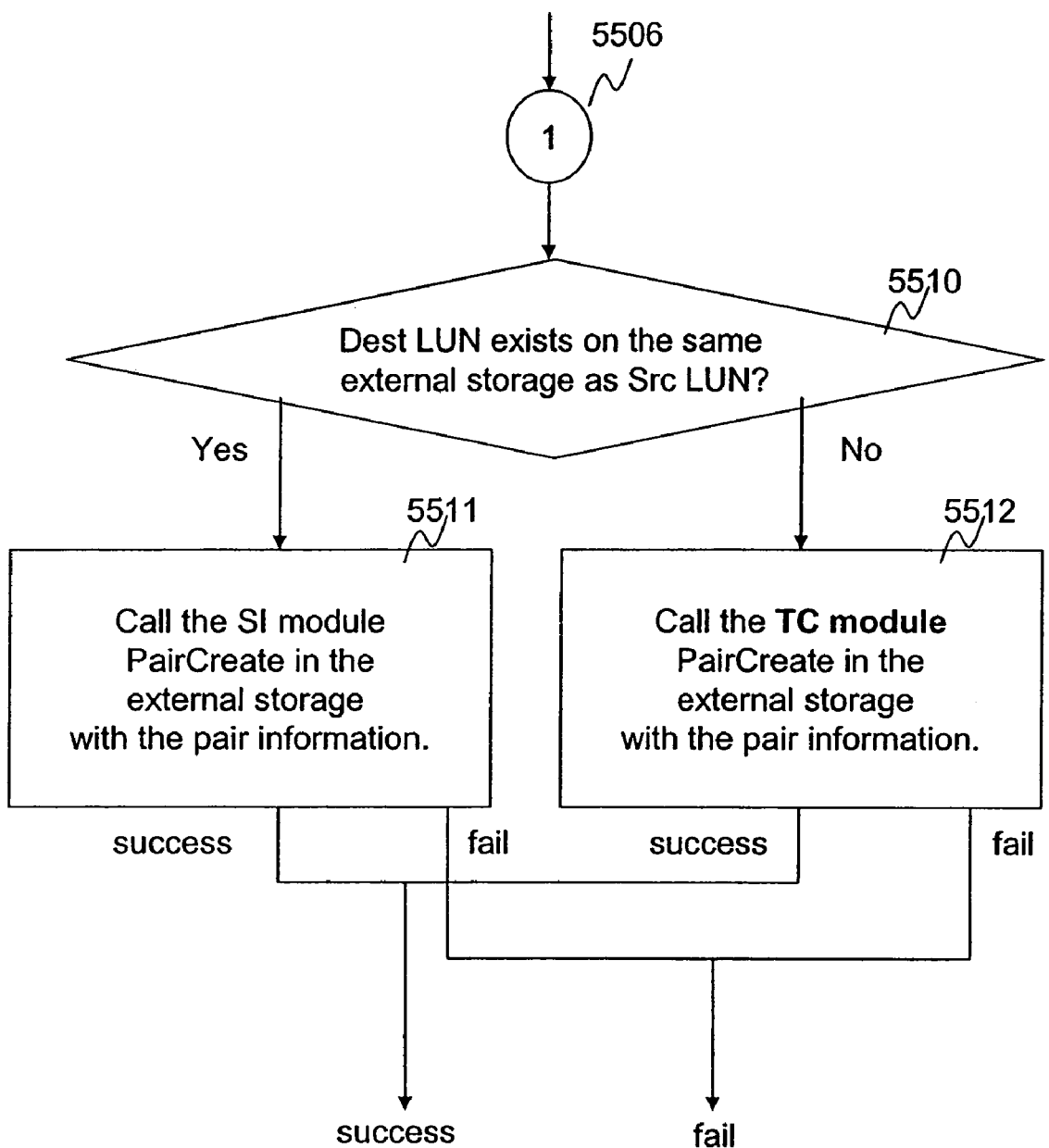
FIG. 20 is a further flow chart illustrating additional steps in that process.

FIGS. 19 and 20 taken together are a flow chart of the pair information delegating mechanism used in the shadow image module. FIG. 19 is similar to FIG. 15, but FIG. 19 includes process 5506. Process 5506 is described in detail in FIG. 20. The flowchart is used to describe situations in which real LUNs exist on different storage systems. If the source and destination volumes are on the same storage system, the shadow image module forwards the pair create command with the associated volumes and the virtual volumes by calling the SI module on the external storage system. The associated logical units are found in the volume management table 2041 which is managed by the external storage management module. The SCSI command can be used for this operation. When the SI module on the external storage receives the request, the pair create process is carried out as shown by step 5511. On the other hand, if the source and destination volumes are not on the same storage system the shadow image module forwards the pair create command with the associated volumes and virtual volumes by calling the TC module on the external storage system. The associated LUNs are found in the volume management table. A SCSI command is also used here. When the TC module on the external storage receives the request, the pair create process starts, as will be discussed in conjunction with FIG. 23.

Figure 21:
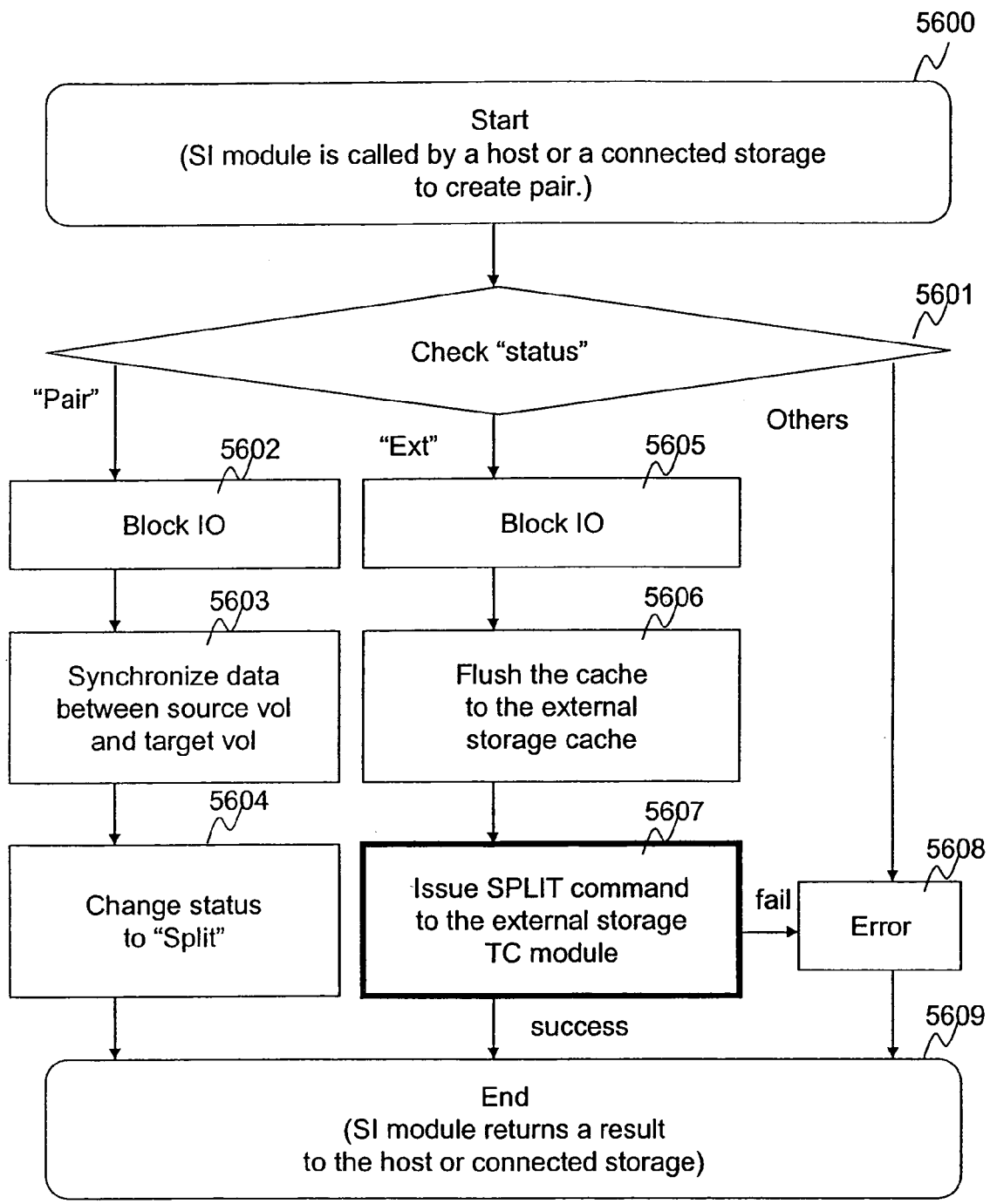
FIG. 21 further illustrates a split process.

FIG. 21 illustrates the split operation when the pair to be split consists of different volumes on different storages systems. The difference between FIG. 17 and FIG. 21 is process 5607 in FIG. 21. In this case the split command is forwarded to the external storage system instead of the SI module. Using the external logical unit number information stored in the volume management table and the CPMT 2071, the shadow image module inputs the external LUNs from the forwarded split command. When the TC module of the external storage system receives this request, the split process begins from step 5800 in FIG. 24.

Figure 22:
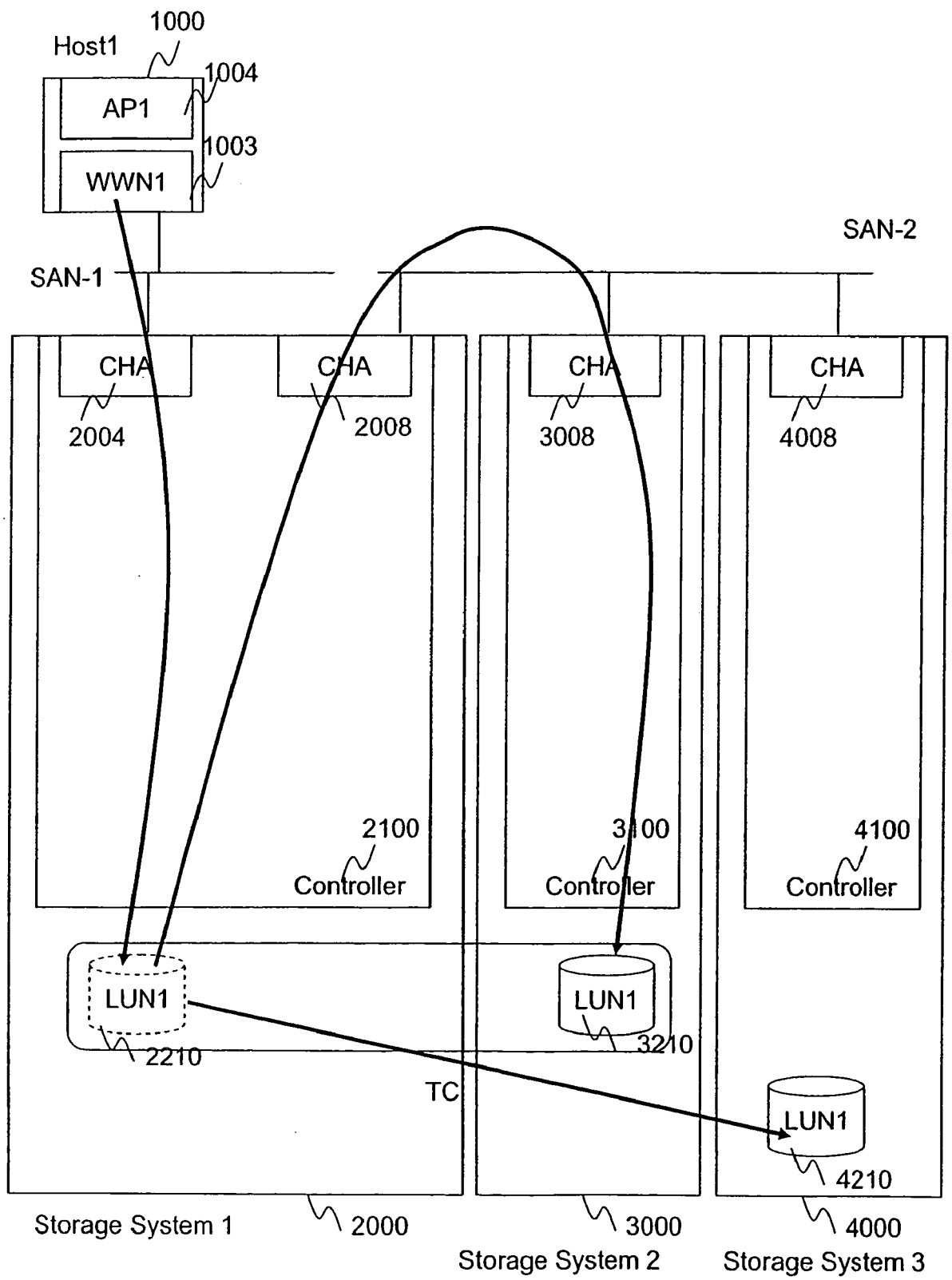
FIG. 22 is a conceptual diagram of a remote copy operation with external storage systems.

FIG. 22 is a conceptual diagram of a remote copy operation with external storage systems. Again, it is assumed volume mapping has been completed. The source volume 2210 is a virtual volume which means that I/O operations are forwarded to the external storage system 3000 and real volume 3210. Volume 3210 is associated with volume 2210, while 4210 is the target volume of a remote copy from virtual volume 2210. Thus, data written to volume 2210 it is forwarded to volume 3210 and also copied to volume 4210 with an appropriate timing. The solid lines in FIG. 22 represent the data flow. In FIG. 22 the pair information between storage system 1 and 3 (and volumes 2210 and 4210) is not inherited by the external storage system 3000.

Figure 23:
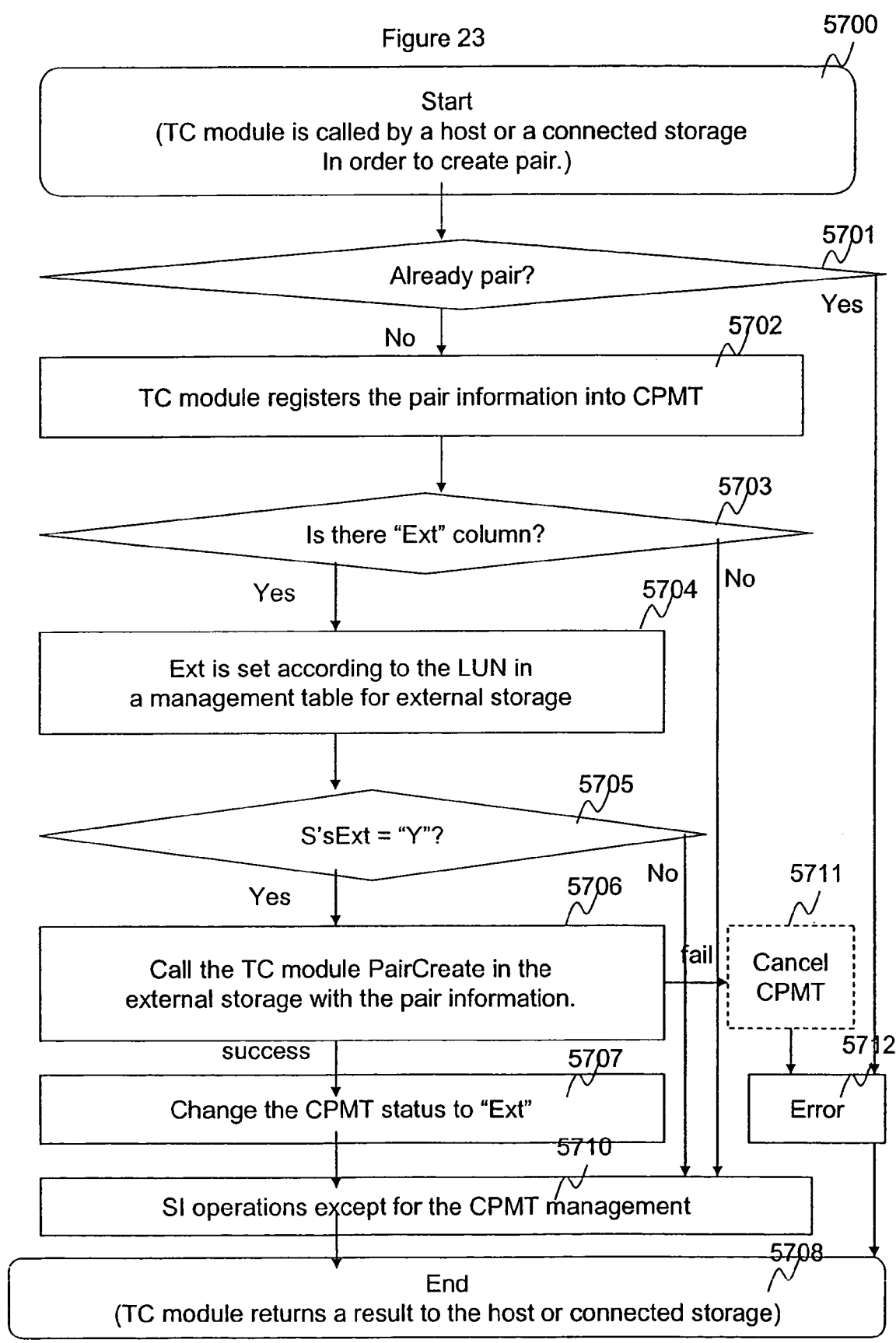
FIG. 23 illustrates a delegation mechanism for the flow of pair information.

FIG. 23 is a flow chart illustrating a pair information delegating mechanism for a true copy module. The process is almost the same as the process of FIG. 16, but in process 5705 only the source volumes Ext column is checked because the destination volume is, in this situation, must be an external volume.

Figure 24:
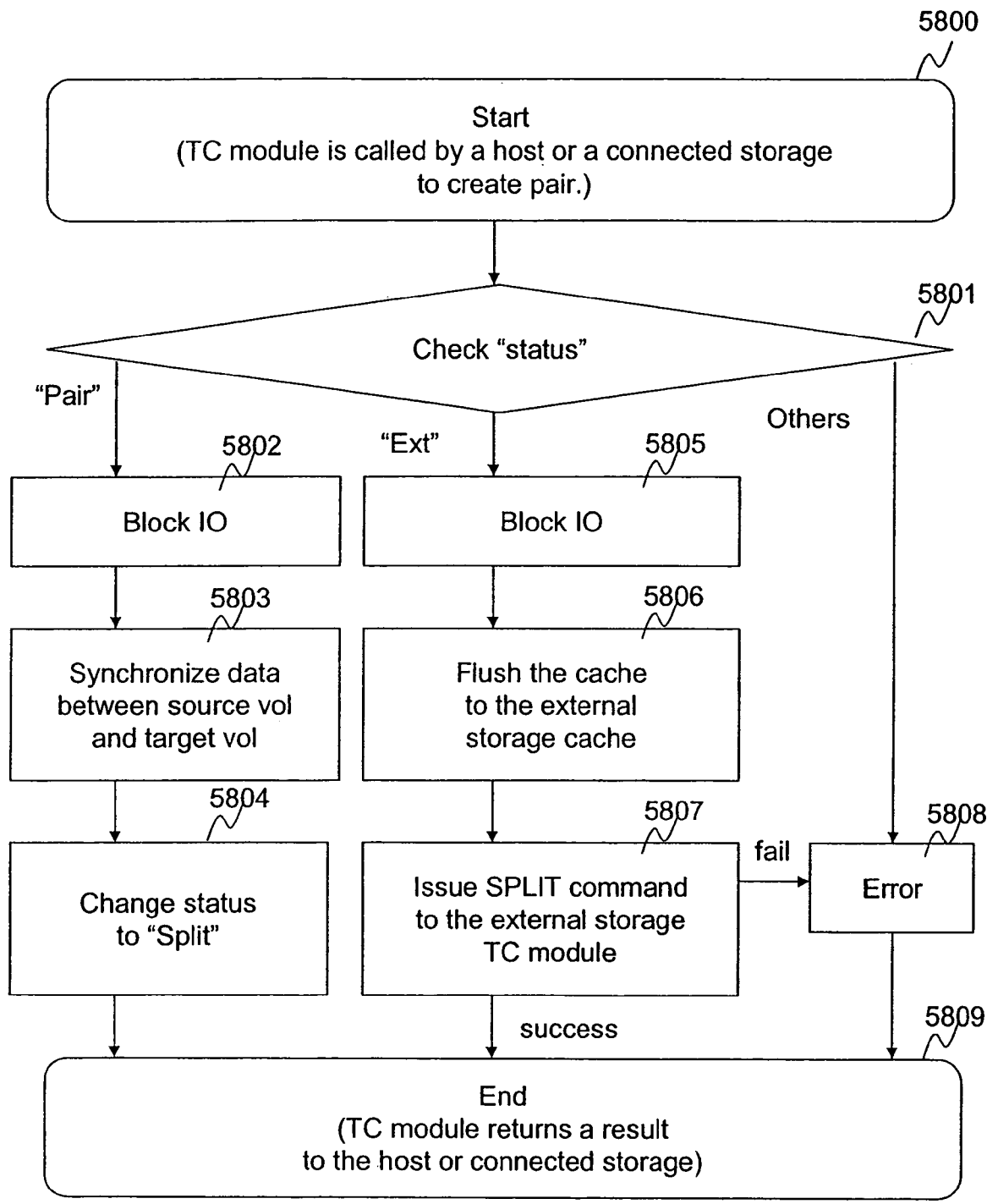
FIG. 24 illustrates a process for forwarding the split command.

FIG. 24 is a flow chart of the split operation for circumstances described above in which the volumes are on different external storage systems. The difference between FIG. 24 and FIG. 17 is process 5807. In this case, the split command is forwarded to the "True Copy" ("TC") module in the external storage system, instead of the shadow image module. The TC module then inputs the external source volume LUN and forwards the split command. When the TC module in the external storage system receives this request the process is carried out. The technique for determining whether the external storage system has a TC module can use the same approach as described in FIG. 23.

Figure 25:
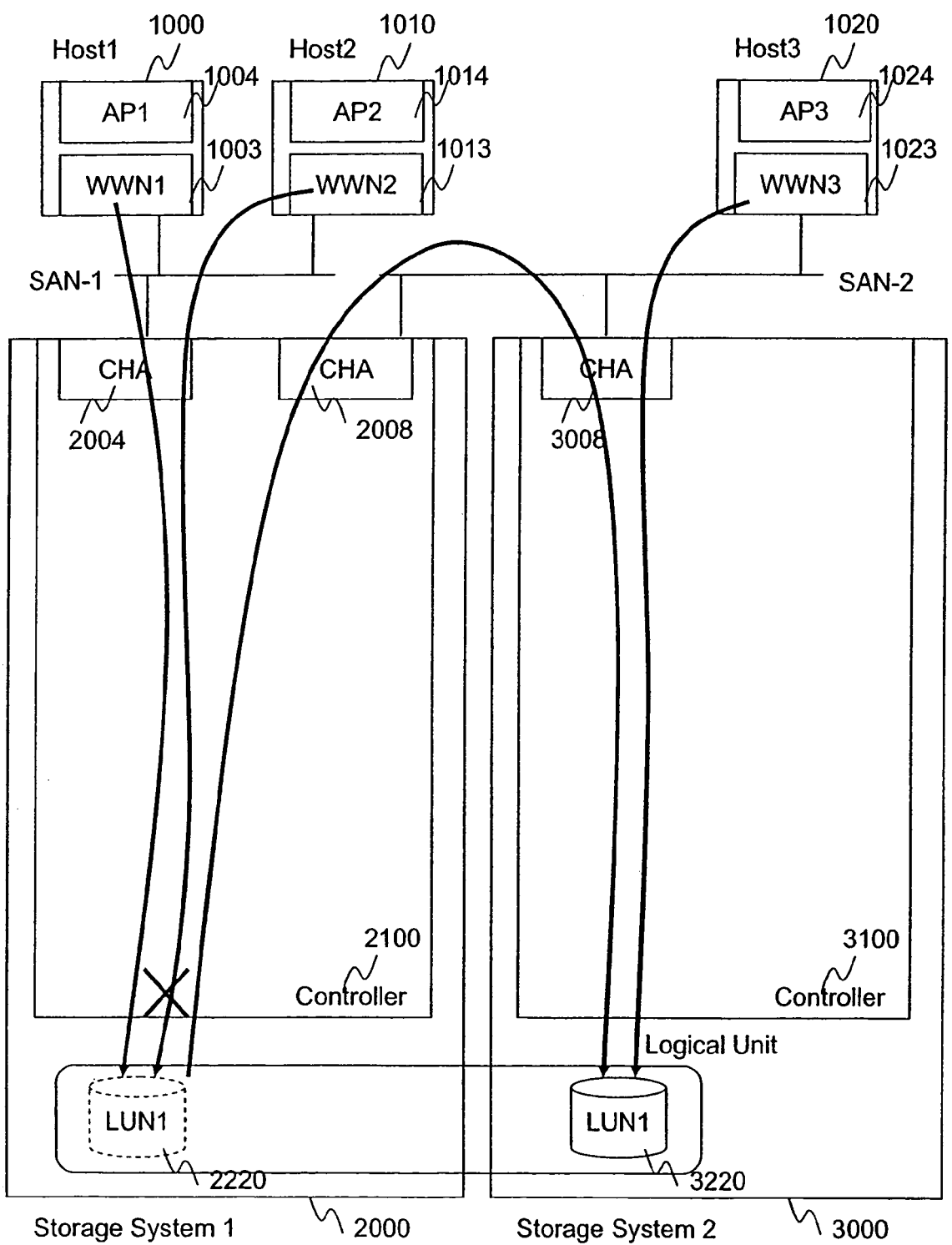
FIG. 25 is a conceptual diagram of a data write operation to an external storage system.

FIGS. 25-28 describe another example in which performance related settings can be forwarded to an external storage system. In this case, the SCSI RESERVATION command is forwarded to an external storage system. FIG. 25 is a conceptual diagram of a data write operation with an external storage system. In this circumstance it is again assumed that volume mapping has been completed, thereby establishing a relationship between volume 2220 and 3220. In the example application 1004 on host 1000 a write data onto volume 2200 on storage system 2000. The data is then forwarded to volume 3220 on storage system 3000. Next assume that application 1014 attempts to write data on to volume 2220. This operation will not be permitted because that volume has already been reserved by application 1004. Despite this reservation, however, application 1024 can write data on to volume 3220 because the reservation by application program 1004 has not been inherited by the external storage system 3000.

Figure 26:
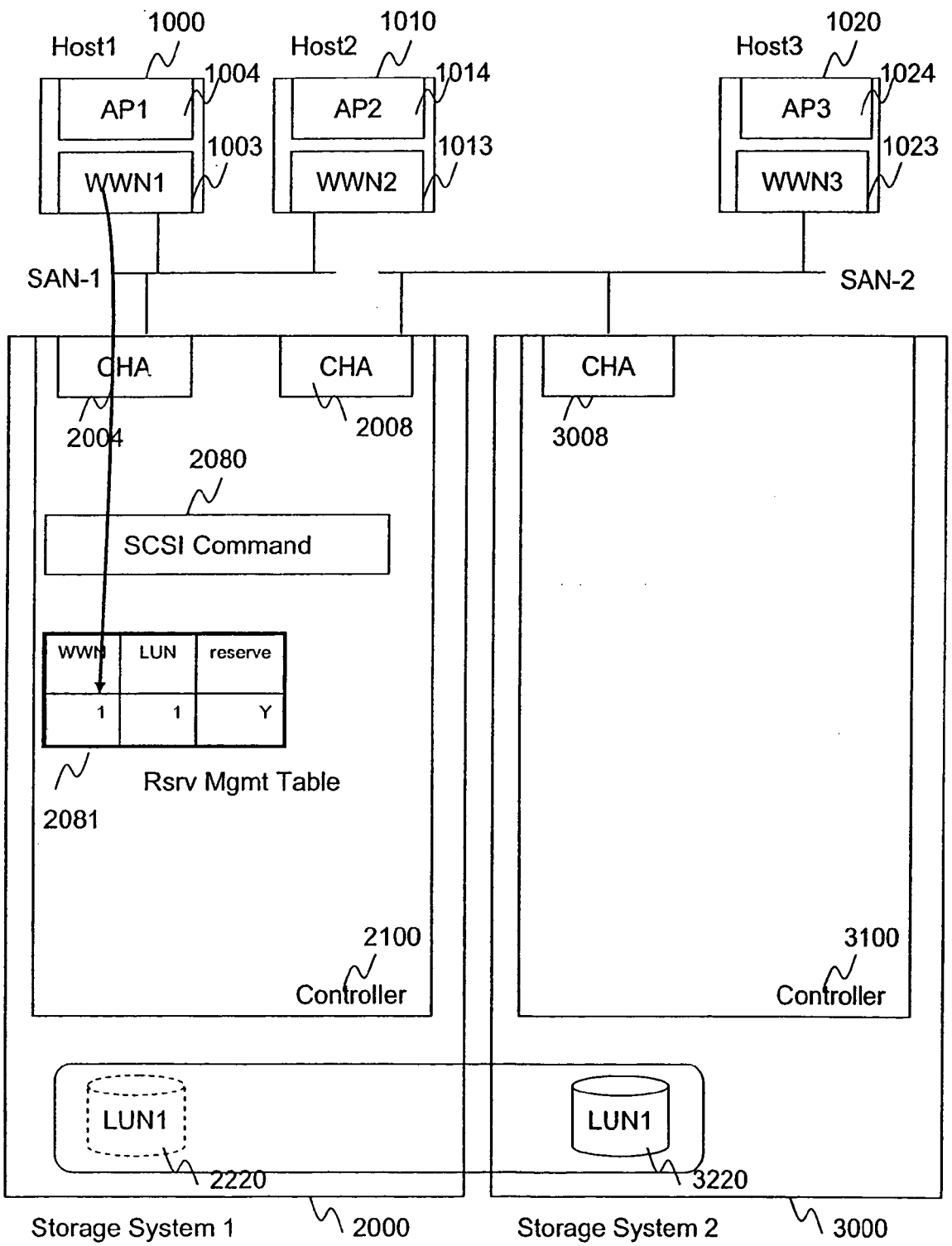
FIG. 26 is an example of the SCSI RESERVATION command.

FIG. 26 illustrates the SCSI reservation command for a storage system. Assume application program 1004 and 1014 invoke the SCSI command processing module 2080 on storage system 2000 to set up a reservation for some volumes. As illustrated, program 1004 accesses LUN 2220 and has reserved that volume. The reservation information, lower case reservation in this case is stored in the reservation management table 2081. The table typically includes the worldwide name, the logical unit number and a flag to designate whether that LUN is reserved or not. Of course other information can also be stored in the table. Based on the information in this table, the SCSI command module 2080 monitors I/O operations from the applications programs and controls the usage of the logical units. As shown on the right hand side of FIG. 26, however, host 1020 can access the volume 3220 without a reservation.

Figure 27:
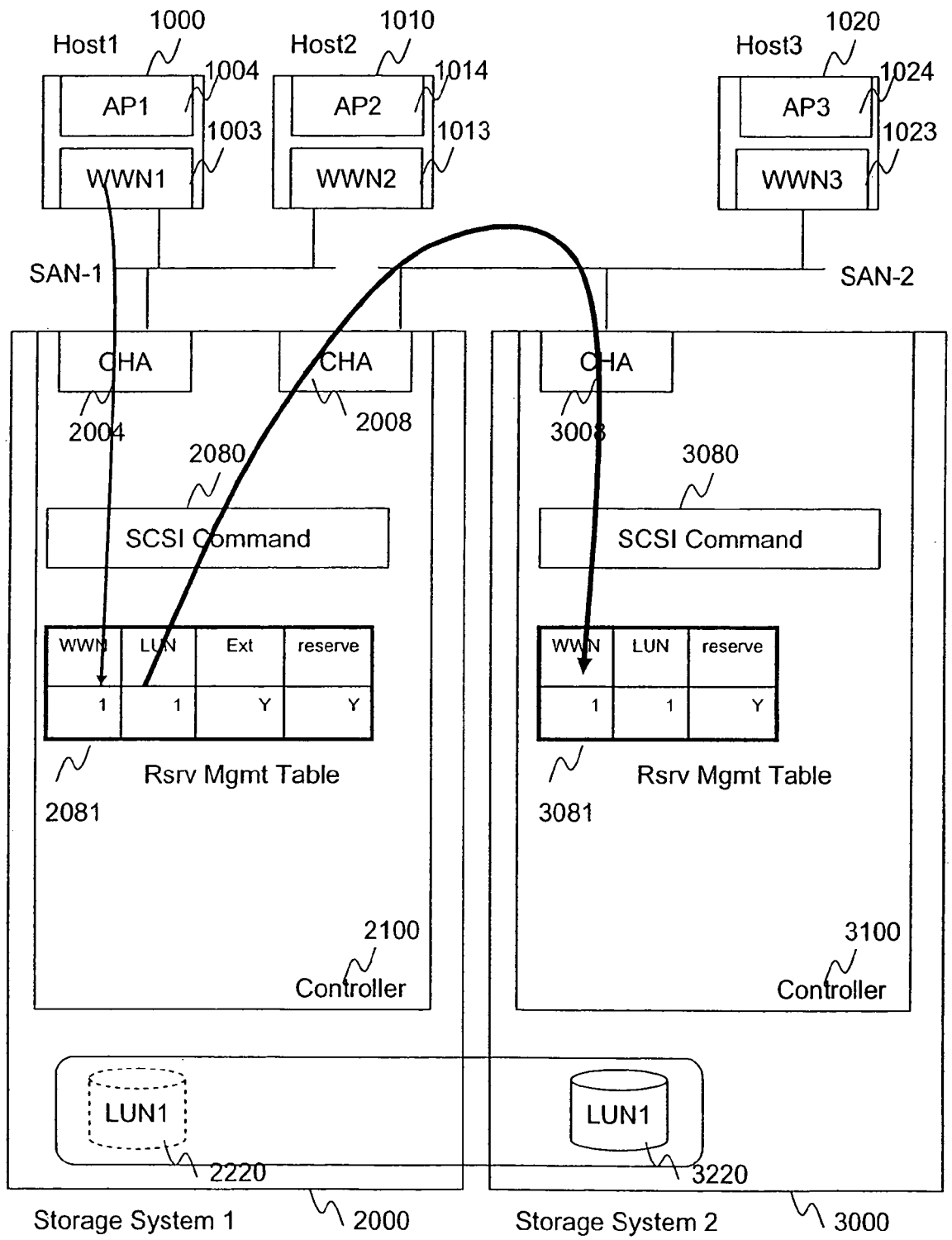
FIG. 27 is a conceptual diagram of a SCSI reservation assurance system.
Figure 28:
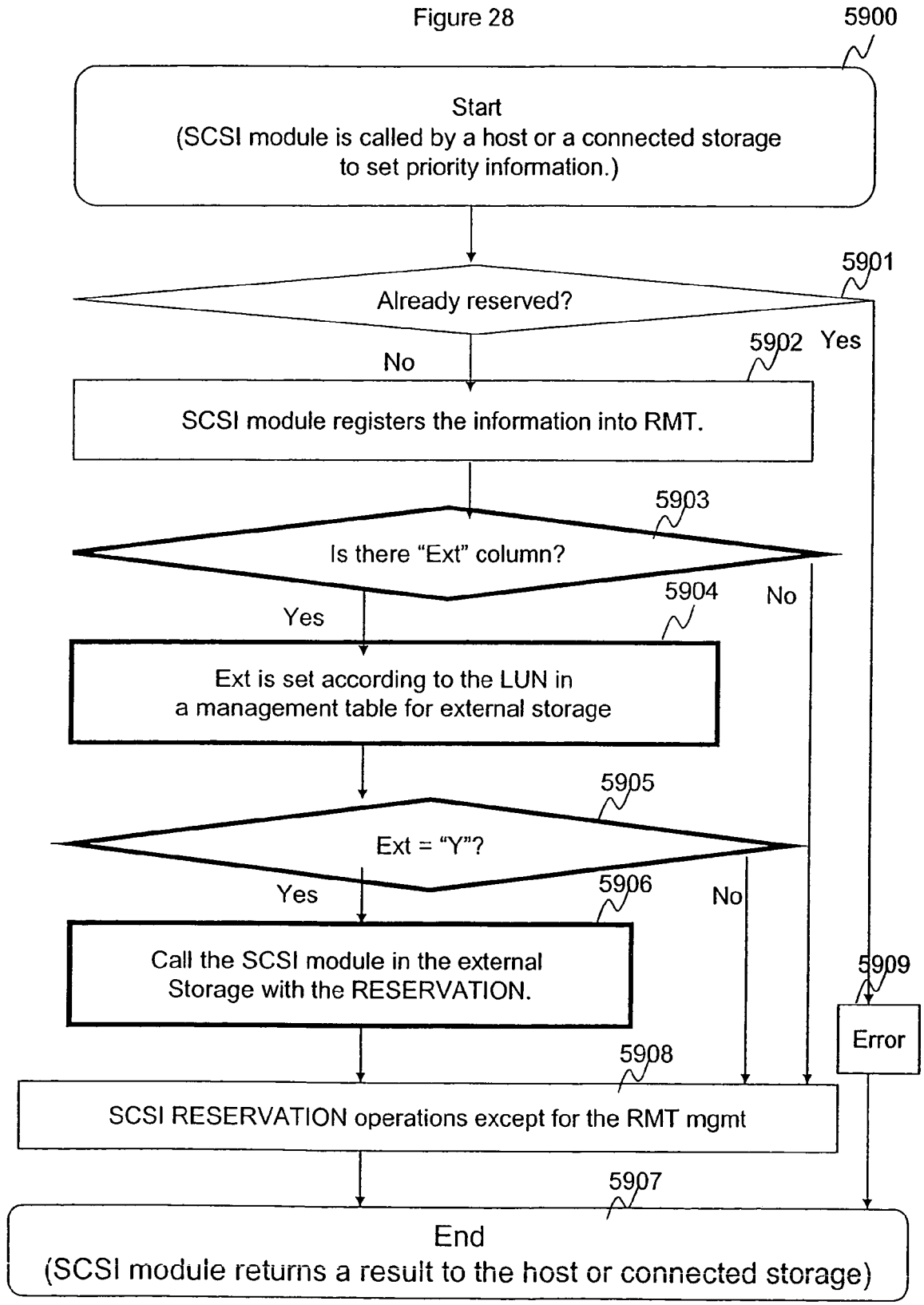
FIG. 28 is a flow chart of the SCSI reservation inheritance mechanism.

FIG. 27 illustrates a solution to this problem by which the reservation management table properties of system 2000 can be inherited by system 3000. The process by which this is achieved is described in detail in FIG. 28. The process begins at step 5900 in which the application starts to set up a SCSI reservation. Parameters are passed from the application system to the processing module, and, as mentioned above, include the worldwide name of the host and the specified volume (LUN) for access. At step 5901 the SCSI command processing module checks to determine if the LUN has already been reserved, and if it has an error is indicated at step 5909. Assuming the volume has not already been reserved, the SCSI module registers the information into the reservation management table. A determination is then made at step 5903 of whether an Ext column in the RMT has been added. If there is no Ext column, then the current SCSI reservation process is carried out and no registration is made in the management table.

On the other hand, if the Ext column exists, it is supplied with information from the volume management table which is used by the external storage management module. If it is a local volume N is indicated, and of an external volume, Y is indicated. At step 5905 the SCSI command processing module checks the Ext column of the requested volume. If the column indicates "Y" meaning that the LUN is a virtual volume, the SCSI command processing module forwards the reservation command to the external storage. The associated LUN is found in the volume management table which is being managed by the external storage management module and is set in the forwarded SCSI reservation command. When the SCSI command processing module on the external storage receives this request, the reservation process begins.

Once the command processing module finishes configuring the reservation the result is returned to the host. If the external LUN has already been reserved, an error is returned. Assuming that it is not, then the reservation information is entered into the table and a result returned to the host or connected storage system. Note that it is possible to cancel the reservation setting for the virtual volume, meaning that the volume is only reserved in the external storage. To do that, after process 5906 is successful, the command processing module cancels the reservation information in the management table.

The forgoing has been a description of several embodiments of the invention. In this description numerous details have been provided for explanation. The scope of the invention is defined by the appended claims.

What is claimed is:

1. In a system having an internal storage system and an external storage system, a method for allowing the external storage system to inherit parameters from the internal storage system, the method comprising:

establishing in the internal storage system a first management table, wherein the first management table includes performance management information relating to storage system operations, the performance management information including a performance parameter for a virtual logical storage unit in the internal storage system and a logical storage unit identifier identifying the virtual logical storage unit, wherein the virtual logical storage unit corresponds to a logical storage unit that is physically present in the external storage system, and wherein information in the first management table is used to operate a controller of the internal storage system;

establishing in the external storage system a second management table for the logical storage unit that is physically present in the external storage system, information in the second management table being used to operate a controller of the external storage system;

transferring the performance management information from the first management table to the second management table, including modifying the logical storage unit identifier in the transferred performance management information to identify the logical storage unit physically present in the external storage system that corresponds to the virtual logical storage unit; and operating the logical storage unit in accordance with the transferred performance management information.

2. A method as in claim 1 wherein the first management table comprises a priority management table which defines priorities among the logical storage units in the internal storage system, and the step of transferring the performance management information comprises transferring an indication of whether the logical storage unit physically present in the external storage system has priority over other units in the external storage system.

3. A method as in claim 1 wherein the first management table comprises a cache management table which defines cache memory operations for the logical storage units in the internal storage system, and the step of transferring the performance management information comprises transferring an indication of an amount of cache memory reserved for use by the logical storage unit physically present in the external storage system.

4. A method as in claim 1 wherein the first management table comprises a copy pair management table which defines logical storage unit copy operations for the logical storage units in the internal storage system, and the step of transferring the performance management information comprises transferring logical storage unit copy configurations for the logical storage unit physically present in the external storage system.

5. A method as in claim 1 wherein the first management table comprises a reservation management table which defines restrictions to access of the logical storage units in the internal storage system, and the step of transferring the performance management information comprises transferring a parameter designating restrictions for accessing the logical storage unit physically present in the external storage system.

6. A method as in claim 1 wherein prior to the step of transferring the performance management information from the internal storage system to the external storage system a determination is made whether the second management table allows storage of parameters from the first management table.

7. A method as in claim 2 wherein the external storage system is coupled to a host, and wherein the second management table includes logical unit numbers for the storage associated with the external storage system, and further includes for at least one such logical unit number, an identification referencing the host having access to that logical unit number.

8. A method as in claim 7 wherein the logical unit numbers and the identification referencing the host having access to that logical unit number are stored in a table.

9. A method as in claim 8 wherein the table further includes information as to at least one of:

whether there is a priority for communications between the host and that logical unit;

whether an amount of cache memory has been assigned to that logical unit;

whether that logical unit has been paired with another logical unit; and whether access to that logical unit has been reserved to a particular host.

10. A system comprising:

an internal storage system including:

a first management table which includes performance management information relating to storage system operations, the performance management information including a performance parameter for a virtual logical storage unit in the internal storage system and a logical storage unit identifier identifying the virtual logical storage unit, wherein the virtual logical storage unit corresponds to a logical storage unit that is physically present in an external storage system; and a controller for operating the internal storage system in accordance with the performance management information; and at least a temporary connection between the internal storage system and the external storage system, wherein the performance management information is transferred from the first management table to a second management table in the external storage system, wherein the logical storage unit identifier in the transferred performance management information is modified to identify the logical storage unit physically present in the external storage system corresponding to the virtual logical storage unit, and wherein the logical storage unit is operated in accordance with the transferred performance management information.

11. A system as in claim 10 wherein the first management table comprises a priority management table which defines priorities among the logical storage units in the internal storage system, and wherein the performance parameter comprises an indication of whether the logical unit physically present in the external storage system has priority over other units in the external storage system.

12. A system as in claim 10 wherein the first management table comprises a cache management table which defines cache memory operations for the logical storage units in the internal storage system, and wherein the performance parameter comprises an indication of an amount of cache memory reserved for use by the logical storage unit physically present in the external storage system.

13. A system as in claim 10 wherein the first management table comprises a copy pair management table which defines logical storage unit copy operations for the logical storage units in the internal storage system, and wherein the performance parameter comprises logical storage unit copy configurations for the logical storage unit physically present in the external storage system.

14. A system as in claim 10 wherein the first management table comprises a reservation management table which defines restrictions to access of the logical storage units in the internal storage system, and wherein the performance parameter comprises a parameter designating restrictions for accessing the logical storage unit physically present in the external storage system.

15. A system as in claim 11 wherein the external storage system is coupled to a host, and wherein the second management table includes logical unit numbers for the storage associated with the external storage system, and further includes for at least one such logical unit number, an identification referencing the host having access to that logical unit number.

16. A system as in claim 15 wherein the logical unit numbers and the identification referencing the host having access to that logical unit number are stored in a table.

17. A system as in claim 16 wherein the table further includes information as to at least one of:

whether there is a priority for communications between the host and that logical unit;

whether an amount of cache memory has been assigned to that logical unit;

whether that logical unit has been paired with another logical unit; and whether access to that logical unit has been reserved to a particular host.

18. A method performed by a system comprising an internal storage system and an external storage system, the internal storage system including a first cache for caching data accesses to logical storage units in the internal storage system, the external storage system including a second cache for caching data accesses to logical storage units in the external storage system, the method comprising:

receiving, at the internal storage system, a request to reserve a portion of the first cache for data accesses to a first logical storage unit in the internal storage system;

in response to the request, storing a first set of cache reservation parameters in a cache management table of the internal storage system, the first set of cache reservation parameters including a cache reserve size and an identifier of the first logical storage unit;

identifying the first logical storage unit as a virtual logical storage unit, wherein data for the first logical storage unit is physically stored in a second logical storage unit resident in the external storage system;

forwarding the first set of cache reservation parameters from the internal storage system to the external storage system;

translating, at the external storage system, the first set of cache reservation parameters into a second set of cache reservation parameters, the translating comprising translating the identifier of the first logical storage unit into an identifier of the second logical storage unit; and storing the second set of cache reservation parameters in a cache management table of the external storage system, thereby reserving a portion of the second cache for data accesses to the second logical storage unit.

* * * * *